United States Patent
Hayakawa et al.

(10) Patent No.: US 8,996,373 B2
(45) Date of Patent: Mar. 31, 2015

(54) STATE DETECTION DEVICE AND STATE DETECTING METHOD

(75) Inventors: Shoji Hayakawa, Kawasaki (JP); Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 13/253,683

(22) Filed: Oct. 5, 2011

(65) Prior Publication Data
US 2012/0166195 A1    Jun. 28, 2012

(30) Foreign Application Priority Data

Dec. 27, 2010    (JP) .................................. 2010-291190

(51) Int. Cl.
| | |
|---|---|
| G10L 15/00 | (2013.01) |
| G10L 15/06 | (2013.01) |
| G10L 17/00 | (2013.01) |
| G10L 15/04 | (2013.01) |
| G10L 15/26 | (2006.01) |
| G10L 15/28 | (2013.01) |
| G06F 17/28 | (2006.01) |
| G10L 17/08 | (2013.01) |
| G10L 17/04 | (2013.01) |

(Continued)

(52) U.S. Cl.
CPC .................. G10L 17/08 (2013.01); G10L 17/04 (2013.01); G10L 17/26 (2013.01); G10L 25/12 (2013.01)
USPC ............... 704/249; 704/2; 704/239; 704/243; 704/244; 704/235; 704/234; 704/246; 704/255; 704/250; 704/251

(58) Field of Classification Search
USPC ......... 704/239, 244, 255, 246, 249, 225, 251, 704/250, 235, 234, 2, 243
See application file for complete search history.

(56) References Cited

U.S. PATENT DOCUMENTS

| | | | |
|---|---|---|---|
| 5,742,928 A * | 4/1998 | Suzuki .......................... | 704/239 |
| 6,766,295 B1 * | 7/2004 | Murveit et al. ............... | 704/243 |
| 6,799,162 B1 * | 9/2004 | Goronzy et al. .............. | 704/244 |

(Continued)

FOREIGN PATENT DOCUMENTS

| | | |
|---|---|---|
| JP | 8-211887 | 8/1996 |
| JP | 11-119791 | 4/1999 |

(Continued)

OTHER PUBLICATIONS

M.J.F.Gales, "Cluster Adaptive Training for Speech Recognition", ICSLP, 1998.*

(Continued)

*Primary Examiner* — Paras D Shah
*Assistant Examiner* — Anne Thomas-Homescu
(74) *Attorney, Agent, or Firm* — Staas & Halsey LLP

(57) ABSTRACT

A state detection device includes: a first model generation unit to generate a first specific speaker model obtained by modeling speech features of a specific speaker in an undepressed state; a second model generation unit to generate a second specific speaker model obtained by modeling speech features of the specific speaker in the depressed state; a likelihood calculation unit to calculate a first likelihood as a likelihood of the first specific speaker model with respect to input voice, and a second likelihood as a likelihood of the second specific speaker model with respect to the input voice; and a state determination unit to determine a state of the speaker of the input voice using the first likelihood and the second likelihood.

16 Claims, 16 Drawing Sheets

(51) Int. Cl.
*G10L 17/26* (2013.01)
*G10L 25/12* (2013.01)

(56) References Cited

U.S. PATENT DOCUMENTS

| | | | |
|---|---|---|---|
| 6,879,956 B1* | 4/2005 | Honda et al. | 704/244 |
| 7,065,488 B2* | 6/2006 | Yajima et al. | 704/255 |
| 7,158,934 B2* | 1/2007 | Honda et al. | 704/244 |
| 7,236,922 B2* | 6/2007 | Honda et al. | 704/2 |
| 7,236,931 B2* | 6/2007 | He et al. | 704/235 |
| 7,340,396 B2* | 3/2008 | Thomson et al. | 704/234 |
| 7,580,836 B1* | 8/2009 | Yan | 704/244 |
| 7,594,200 B2* | 9/2009 | Eisner et al. | 716/134 |
| 7,603,276 B2* | 10/2009 | Yoshizawa | 704/256.2 |
| 7,657,432 B2* | 2/2010 | Chaudhari et al. | 704/250 |
| 7,684,984 B2* | 3/2010 | Kemp | 704/235 |
| 8,096,863 B2* | 1/2012 | Annunziata | 463/1 |
| 8,180,638 B2* | 5/2012 | Kim et al. | 704/250 |
| 8,271,282 B2* | 9/2012 | Harada | 704/251 |
| 8,504,366 B2* | 8/2013 | Hagai et al. | 704/246 |
| 2003/0023444 A1* | 1/2003 | St. John | 704/270.1 |
| 2003/0033145 A1* | 2/2003 | Petrushin | 704/236 |
| 2004/0093210 A1* | 5/2004 | Toyama | 704/233 |
| 2007/0208569 A1* | 9/2007 | Subramanian et al. | 704/270 |
| 2007/0239441 A1* | 10/2007 | Navratil et al. | 704/225 |
| 2008/0010065 A1* | 1/2008 | Bratt et al. | 704/246 |
| 2008/0065380 A1* | 3/2008 | Kwak et al. | 704/243 |
| 2008/0195387 A1* | 8/2008 | Zigel et al. | 704/236 |
| 2008/0270127 A1* | 10/2008 | Kobayashi et al. | 704/226 |
| 2008/0312926 A1* | 12/2008 | Vair et al. | 704/249 |
| 2009/0265170 A1* | 10/2009 | Irie et al. | 704/236 |
| 2009/0271201 A1* | 10/2009 | Yoshizawa | 704/255 |
| 2010/0008519 A1* | 1/2010 | Hayakawa et al. | 381/94.1 |
| 2010/0056227 A1* | 3/2010 | Hayakawa et al. | 455/570 |
| 2010/0169094 A1* | 7/2010 | Akamine et al. | 704/244 |
| 2010/0217595 A1* | 8/2010 | Kim et al. | 704/250 |
| 2011/0178803 A1* | 7/2011 | Petrushin | 704/270 |
| 2011/0307257 A1* | 12/2011 | Pereg et al. | 704/251 |
| 2012/0065974 A1* | 3/2012 | Hagai et al. | 704/246 |
| 2014/0257809 A1* | 9/2014 | Goel et al. | 704/239 |

FOREIGN PATENT DOCUMENTS

| | | |
|---|---|---|
| JP | 11-212587 | 8/1999 |
| JP | 2004-109464 | 4/2004 |
| JP | 3652753 | 3/2005 |
| JP | 2005-249874 | 9/2005 |
| JP | 2010-20165 | 1/2010 |
| JP | 2010-54731 | 3/2010 |
| WO | 2005/098820 A1 | 10/2005 |

OTHER PUBLICATIONS

F. Villavicencio et al., "Improving LPC Spectral Envelope Extraction of Voiced Speech by True-Envelope Estimation", ICASSP 2006 Proceedings.*

N. Kitaoka et al., "Speaker Independent Speech Recognition Using Features Based on Glottal Sound Source", 7th International Conference on Spoken Language Processing, 2002.*

G. Morrison, "Estimating the Precision of the Likelihood-Ratio Output of a Forensic-Voice-Comparison System", Odyssey 2010, The Speaker and Language Recognition Workshop.*

A. Reynolds et al., "Speaker Verification Using Adapted Gaussian Mixture Models", Digital Signal Processing, vol. 10, 2000, pp. 19-41.

K. Shikano et al., "Audio Recognition System" Ohmsha, sections 1.2 and 1.3.1, May 15, 2001, pp. vii-xii, 4-13.

S. Miyamoto, "Approach to Cluster Analysis" Morikita Publishing Co., Ltd., sections 2.1 and 2.2, Oct. 30, 1999, pp. v, vi, 13-24.

A. Reynolds et al., "Robust Text-Independent Speaker Identification Using Gaussian Mixture Speaker Models", IEEE Trans. On Speech and Audio Process., vol. 3, No. 1, 1995, pp. 72-83.

A. Reynolds et al., "Speaker Verification Using Adapted Gaussian Mixture Models", Digital Signal Processing, vol. 10, 2000, pp. 19-41.

F. Martin et al., "Recognition of Noisy Speech by Composition of Hidden Markov Models", Technical Report of IEICE SP92-96, 1992, pp. 9-16.

* cited by examiner

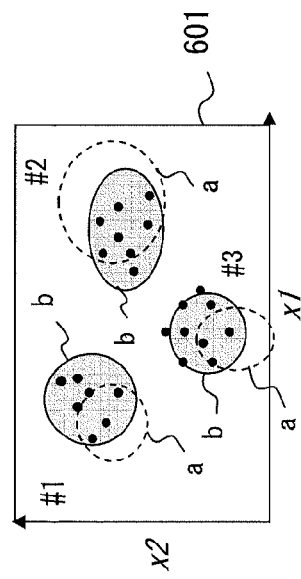
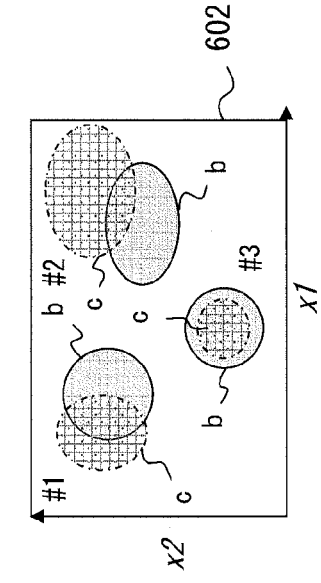
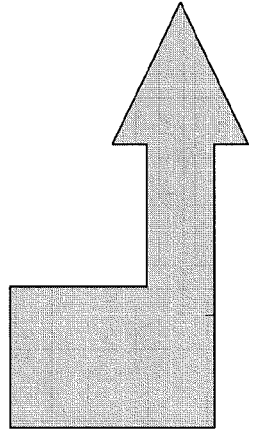

(1) GENERATION OF STATIC STATE MODEL FOR SPEAKER F

- • FEATURE VECTOR OF STATIC STATE UTTERANCE DATA OF SPEAKER F
- ◯ DISTRIBUTION OF BASIC MODEL
- ● DISTRIBUTION OF STATIC STATE MODEL FOR SPECIFIC SPEAKER ABOUT SPEAKER F (2) GENERATION OF ABNORMAL STATE MODEL FOR SPEAKER F

- ▨ DISTRIBUTION OF ABNORMAL STATE MODEL FOR SPECIFIC SPEAKER ABOUT SPEAKER F

CORRESPONDENCE TABLE 431

| DISTRIBUTION NUMBER i | AMOUNT OF MOVEMENT OF AVERAGE VALUE | AMOUNT OF CHANGE OF VARIANCE |
|---|---|---|
| #1 | $\mu'_1$ : (−0.5, 0.1) | $\sigma'^2_1$ : (−0.02, 0.0) |
| #2 | $\mu'_2$ : (0.6, 0.6) | $\sigma'^2_2$ : (0.01, 0.01) |
| #3 | $\mu'_3$ : (0.0, 0.0) | $\sigma'^2_3$ : (−0.03, −0.03) |
| ... | ... | ... |

F I G. 6

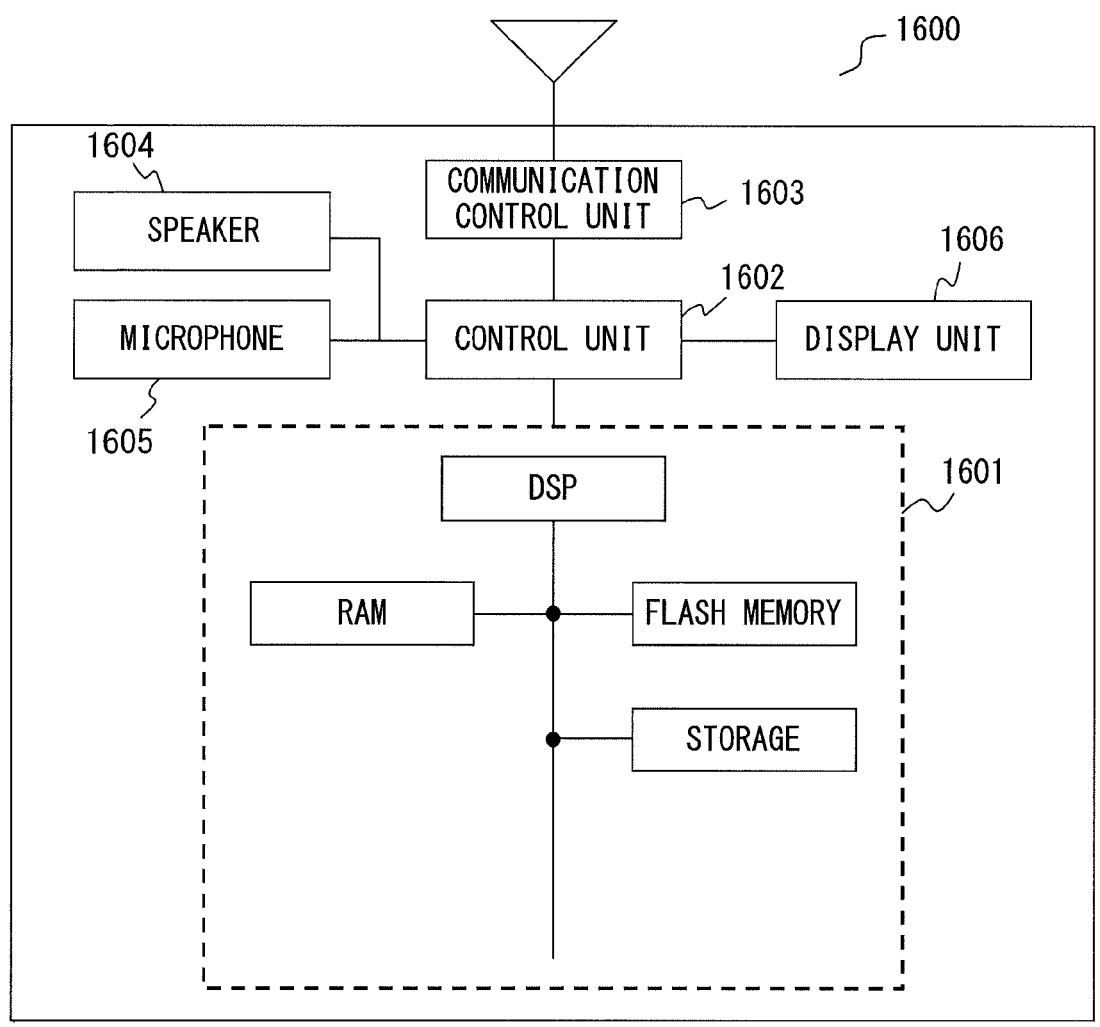
F I G. 16

STATE DETECTION DEVICE AND STATE DETECTING METHOD

CROSS-REFERENCE TO RELATED APPLICATION

This application is based upon and claims the benefit of priority of the prior Japanese Patent Application No. 2010-029119, filed on Dec. 27, 2010, the entire contents of which are incorporated herein by reference.

FIELD

A certain aspect of the embodiments discussed herein is related to a state detection device and a state detecting method.

BACKGROUND

There has been a technique for recognizing the emotion etc. of a speaker from the voice of the speaker.

Relating to the technique above, there is an utterance modified speech recognition device having a high recognition performance even when there is a small amount of speech data used in learning an utterance modification model. The utterance modified speech recognition device learns an utterance modification model representing a modification of a phoneme spectrum occurring in the voice having an utterance modification. Then, the utterance modified speech recognition device outputs a standard modified voice model by performing a spectrum modifying process using an utterance modification model on a standard voice model without utterance modifications. Next, the utterance modified speech recognition device performs a recognizing process on an utterance modified voice feature vector time series obtained by performing a sound analysis on an input voice signal using a standard modified voice model and a standard voice model without utterance modifications.

Furthermore, there is a speech recognition system known for recognizing the level of the emotion of a speaker. The speech recognition system includes, for example, a voice analysis unit, a dictionary unit, a acoustic model unit, an utterance modifying emotion model unit, and a voice-emotion recognition unit. Then, the dictionary unit stores a word for speech recognition. The acoustic model unit stores a model for use in the speech recognition. Practically, it stores a acoustic model indicating the correspondence between a character and a phoneme used in the dictionary unit. The utterance modifying emotion model unit stores an utterance modifying emotion model indicating the correspondence between a character and a phoneme used in the dictionary unit when the emotion has changed. The voice-emotion recognition unit stores the level indicating a word in phoneme units and the strength of the emotion.

Then, the speech recognition system compares for the voice analysis result of the input voice analyzed by the voice analysis unit between the acoustic model and the dictionary by phoneme units connected by a model connecting unit, and picks up the most likely word in the dictionary enrolled in the dictionary unit. Furthermore, the speech recognition system selects from the voice-emotion recognition unit the level indicating the strength of the emotion represented by the input voice of the picked up word.

In addition, in the speech recognition devices which recognizes voice by comparing a synthetic voice model to which noise adaptation and speaker adaptation are applied with a feature vector sequence obtained by the uttered voice during the utterance, a speech recognition device capable of reducing the computational complexity when noise adaptation, speaker adaptation, etc. are performed on an initial voice model is well known.

[Patent Document 1] Japanese Laid-open Patent Publication No. 08-211887

[Patent Document 2] Japanese Laid-open Patent Publication No. 11-119791

[Patent Document 3] Japanese Laid-open Patent Publication No. 2004-109464

[Non-patent Document 1] "Speech recognition System" by Kiyohiro Kano, Katsunobu Ito, Tatsuya Kawahara, Kazuya Takeda, and Mikio Yamamoto, and published by Ohmsha

[Non-patent Document 2] "Introduction to Cluster Analysis" by Sadaaki Miyamoto, and published by Morikita Publication

[Non-patent Document 3] Douglas A. Reynolds/Richard C. Rose, "Robust text-independent speaker identification using Guassian mixture speaker models" IEEE Trans. on Speech and Audio Process, vol. 3, no. 1, pp. 72-83 1995

[Non-patent Document 4] Douglas A. Reynolds/Thomas F. Quatieri/Robert B. Dunn, "Speaker verification using adapted Gaussian Mixture models", Digital Signal Processing, vol. 10, pp. 19-41 2000

SUMMARY

According to an aspect of the embodiment, the state detection device includes the following components.

A basic model storage unit stores a basic model obtained by modeling the feature of the voice acquired from a plurality of unspecific speakers.

A correspondence information storage unit stores the correspondence information indicating the correspondence between a first unspecific speaker model and a second unspecific speaker model. The first unspecific speaker model is obtained by modeling the speech features of unspecific speakers in an undepressed state. The second unspecific speaker model is obtained by modeling speech features of unspecific speakers in a depressed state.

A first model generation unit extracts the speech features of a specific speaker in the undepressed state, and adjusts the basic model so that the extracted feature is indicated, thereby generates a first specific speaker model obtained by modeling the speech features of the specific speaker in the undepressed state.

A second model generation unit reflects the amount of displacement from the first unspecific speaker model to the second unspecific speaker model on the first specific speaker model using the correspondence information. Thus, the second model generation unit models the speech features of the specific speaker in the depressed state, and generates a second specific speaker model.

A likelihood calculation unit calculates a first likelihood as the likelihood of the first specific speaker model with respect to the feature of input voice, and a second likelihood as the likelihood of the second specific speaker model with respect to the input voice.

A state determination unit determines the state of the speaker of the input voice using the first likelihood and the second likelihood.

The object and advantages of the embodiment will be realized and attained by means of the elements and combinations particularly pointed out in the claims.

BRIEF DESCRIPTION OF DRAWINGS

FIG. 6 is an explanatory view of generating a static state model for a specific speaker and an abnormal state model for a specific speaker;

FIG. 16 is an example of a configuration of a mobile telephone 1600 including the state detection device described with respect to an embodiment.

DESCRIPTION OF EMBODIMENTS

For example, the utterance modified speech recognition device above performs a recognizing process using a standard modified voice model and a standard voice model without utterance modifications, but a standard voice model without utterance modifications is not a model specified for a specific speaker. Therefore, it is hard to consider that a standard modified voice model generated from a standard voice model without utterance modifications is a model sufficiently specified for a specific speaker. Accordingly, the device has a recognition rate lower than the case in which a standard modified voice model and a standard voice model without utterance modifications specified for a specific speaker are used.

In the above-mentioned speech recognition system, an utterance modified emotion model, a word in a phoneme unit, and a emotion level are not specialized for a specific speaker. Therefore, the recognition performance of the feeling level about a specific speaker has been low.

Figure 1:
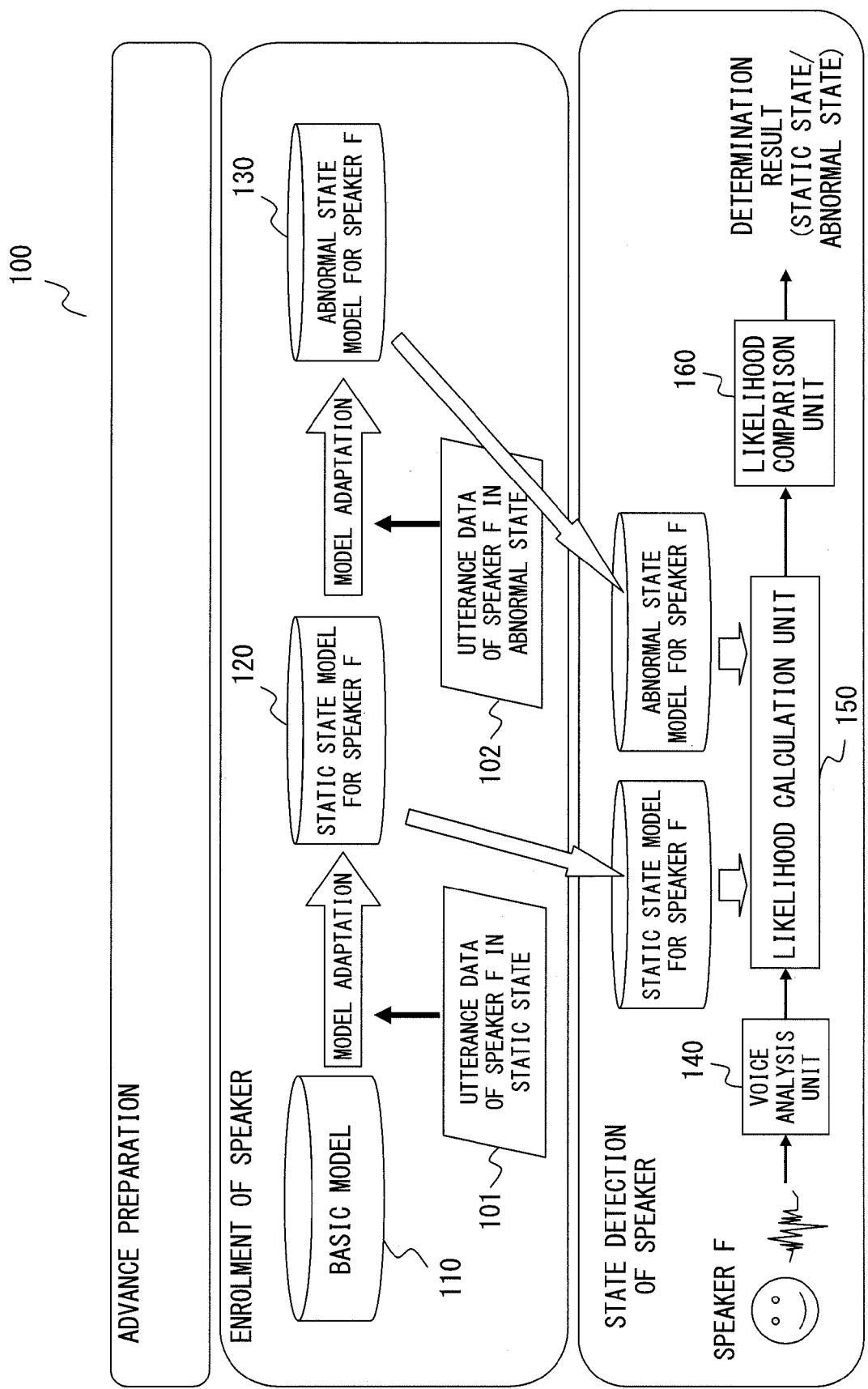
FIG. 1 is an explanatory view of the outline of the state detection device considered by the applicant.
Figure 2:
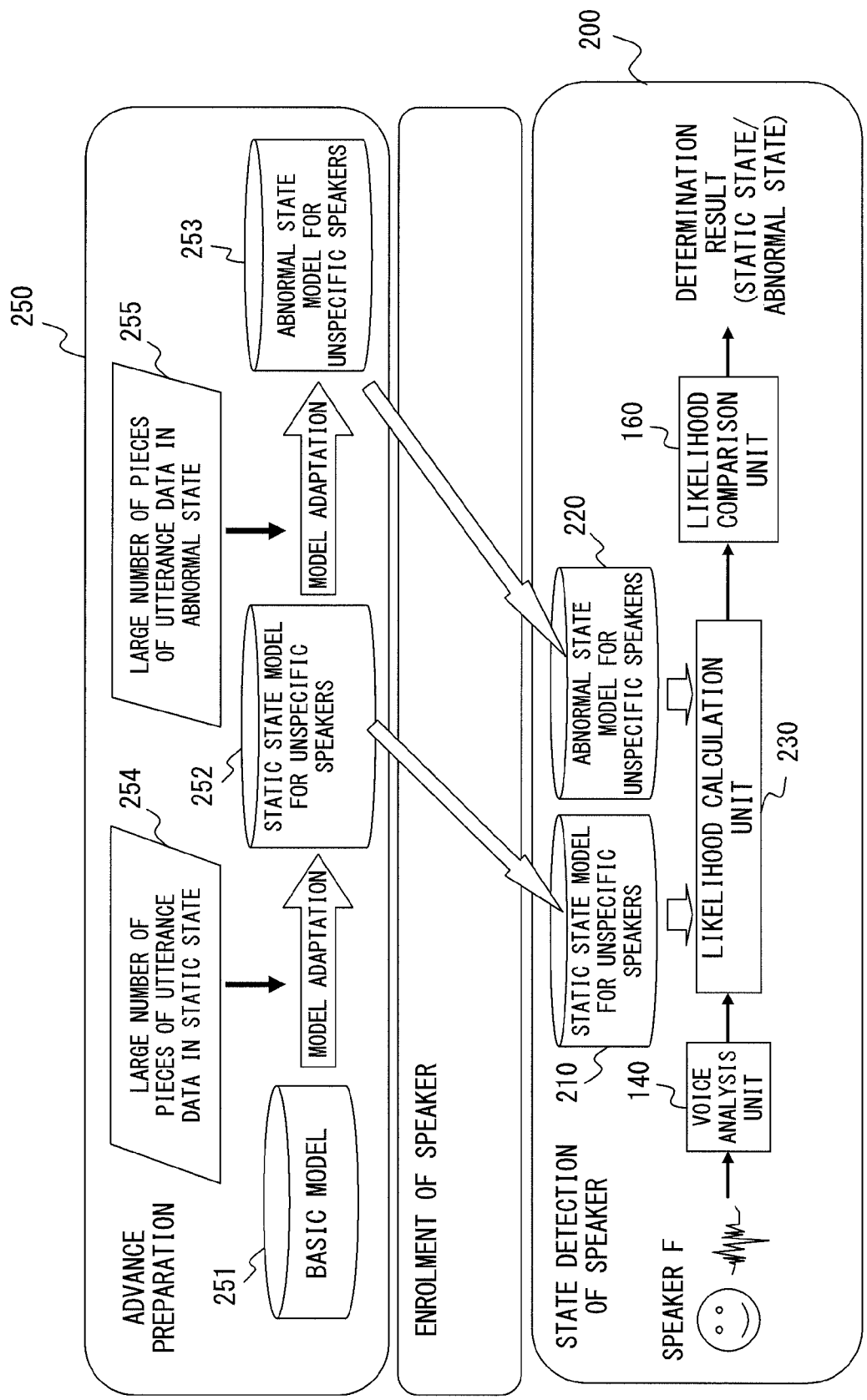
FIG. 2 is an explanatory view of the outline of the state detection device considered by the applicant.

FIGS. 1 and 2 are explanatory view of the outline of the state detection device considered by the applicant.

A state detection device 100 illustrated in FIG. 1 includes a storage unit 110 storing a basic model, a storage unit 120 storing a static state model for a specific speaker, a storage unit 130 storing an abnormal state model for a specific speaker, a voice analysis unit 140, a likelihood calculation unit 150, and a likelihood comparison unit 160.

In FIG. 1, a device to be used is described for each of the processes for an "advance preparation", an "enrolment of a speaker", and "detection of the state of a speaker" for comprehensibility of the state detection device 100. However, it is not to limit the configuration of the state detection device 100, for example, the arrangement of the devices, the connection among the devices, etc. FIG. 2 illustrates the same gist.

The basic model stored in the storage unit 110 refers to the information about the speech features of a standard speaker. The basic model is expressed by a model obtained by quantizing a feature parameter extracted from among a large amount of speech data acquired from unspecific speakers using a Gaussian mixture model (hereafter referred to as a "GMM"). The basic model is generated in advance and stored in the storage unit 110. The feature parameter is described in detail with reference to FIG. 7.

The static state model for a specific speaker stored in the storage unit 120 refers to the information obtained by quantizing the feature parameter extracted from the speech data acquired from a specific speaker in the static state using the GMM.

The abnormal state model for a specific speaker stored in the storage unit 130 refers to the information obtained by quantizing the feature parameter extracted from the speech data acquired from a specific speaker in the abnormal state using the GMM.

The state detection device 100 needs an enrolment of a speaker whose detection is to be detected in performing a state detecting process. By the enrolment of a speaker, the state detection device 100 generates a static state model for a specific speaker and an abnormal state model for a specific speaker.

For example, a user of the state detection device 100 enrolls utterance data 101 of a speaker F in the static state and utterance data 102 of the speaker F in the abnormal state in the state detection device 100. Then, the state detection device 100 adapts the basic model to the utterance data 101 of the speaker F in the static state, and generates a static state model for a specific speaker about the speaker F. Then, the state detection device 100 stores the generated static state model for a specific speaker in the storage unit 120.

"To adapt" is to adjust a parameter included in the basic model by the parameter obtained from the feature parameter extracted from the utterance data 101 of the speaker F in the static state.

Furthermore, the state detection device 100 adapts the static state model for a specific speaker about the speaker F to utterance data 102 of the speaker F in the abnormal state, and generates an abnormal state model for a specific speaker about the speaker F. Then, the state detection device 100 stores the generated abnormal state model for a specific speaker in the storage unit 130.

When the enrolment of the speaker is completed, the state detection device 100 detects the state of the speaker F as described below.

For example, when the utterance data of the speaker F is input, the voice analysis unit 140 extracts the feature parameter from the utterance data of the speaker F. Then, the likelihood calculation unit 150 calculates the likelihood of the static state model for a specific speaker about the speaker F with respect to the extracted feature parameter. Furthermore, the likelihood calculation unit 150 calculates the likelihood of the abnormal state model for a specific speaker about the speaker F with respect to the extracted feature parameter.

The likelihood comparison unit 160 compares the two likelihoods calculated by the likelihood calculation unit 150 with each other, and determines the state of the speaker F, that is, whether the speaker F is in the static state or in the abnormal state. The likelihood comparison unit 160 outputs the determination result to a specified device etc.

As described above, since the state detection device 100 generates a static state model for a specific speaker and an abnormal state model for a specific speaker during the enrolment of the speaker, it needs no advance preparation for using the state detecting function. The advance preparation is a preparation needed, for example, before shipping as a product the state detection device 100 or a device including the state detection device 100.

Since the state detection device 100 detects the state of a speaker using a static state model for a specific speaker and an abnormal state model for a specific speaker, the state of a speaker may be detected with high accuracy.

However, it is a heavy load for a user to enrol the voice of a specific speaker in the abnormal state.

A state detection device 200 illustrated in FIG. 2 includes a storage unit 210 storing a static state model for unspecific speakers, a storage unit 220 storing an abnormal state model for unspecific speakers, a voice analysis unit 140, a likelihood calculation unit 230, and a likelihood comparison unit 160.

The static state model for unspecific speakers stored in the storage unit 210 refers to the information obtained by quantizing the feature parameter extracted from the speech data acquired from a number of unspecific speakers in the static state using the GMM.

The abnormal state model for unspecific speakers stored in the storage unit 220 refers to the information obtained by quantizing the feature parameter extracted from the speech data ad from a number of unspecific speakers in the abnormal state using the GMM.

The state detection device 200 needs an advance preparation for detecting a state. In the advance preparation, a static state model for unspecific speakers and an abnormal state model for unspecific speakers for use in detecting a state are generated.

The advance preparation may be performed by the information processing device 250 capable of communicating data directly or indirectly with the state detection device 200. The state detection device 200 itself may perform the advance preparation.

The information processing device 250 includes a storage unit 251 storing a basic model, a storage unit 252 storing a static state model for unspecific speakers, and a storage unit 253 storing an abnormal state model for unspecific speakers.

The information processing device 250 generates a static state model for unspecific speakers by adapting the basic model to a number of pieces of static state speaker data 254. The information processing device 250 stores the generated static state model for unspecific speakers in the storage unit 252. The information processing device 250 generates an abnormal state model for unspecific speakers by adapting a static state model for unspecific speakers to a number of pieces of abnormal state speaker data 255. The information processing device 250 stores the generated abnormal state model for unspecific speakers in the storage unit 253.

The static state speaker data 254 is speech data acquired from unspecific speakers in the static state. The abnormal state speaker data 255 is speech data acquired from unspecific speakers in the abnormal state.

When a static state model for unspecific speakers and an abnormal state model for unspecific speakers are generated, the information processing device 250 stores the static state model for unspecific speakers stored in the storage unit 252 in the storage unit 210 provided for the state detection device 200. The information processing device 250 stores the abnormal state model for unspecific speakers stored in the storage unit 253 in the storage unit 220 provided in the state detection device 200.

When the above-mentioned advance preparation is completed, the state detection device 200 detects the state of the speaker as described below when the device may detect the state.

For example, when the utterance data of the speaker F is input, the voice analysis unit 140 extracts the feature parameter from the utterance data of the speaker F. Then, the likelihood calculation unit 230 calculates the likelihood of the static state model for unspecific speakers with respect to the extracted feature parameter. Furthermore, the likelihood calculation unit 230 calculates the likelihood of the abnormal state model for unspecific speakers with respect to the extracted feature parameter.

In the likelihood comparison unit 160, the likelihood comparison unit 160 compares the two likelihoods calculated by the likelihood calculation unit 230 with each other, and determines the state of the speaker F, that is, whether or not the speaker F is in the static state or in the abnormal state. The likelihood comparison unit 160 outputs a determination result to a specified device etc.

As described above, the state detection device 200 generates in advance a static state model for unspecific speakers and an abnormal state model for unspecific speakers. Then, the state detection device 200 detects the state of the speaker using the static state model for unspecific speakers and the abnormal state model for unspecific speakers. Therefore, the state detection device 200 does not need the enrolment of the speaker needed by the state detection device 100. As a result, no heavy load is imposed on the state detection device 200 by the enrolment of a speaker.

However, since the state detection device 200 uses the static state model for unspecific speakers and the abnormal state model for unspecific speakers in detecting the state of a speaker, it indicates much lower accuracy in detecting the state of a specific speaker than the state detection device 100.

From the description above, the applicant extracts the problem to provide a state detection device capable of detecting the state of a specific speaker with high accuracy using the information included in the voice with the lower load imposed on the necessary process for detecting the state of a speaker such as an enrolment of a speaker etc.

An example of the present embodiment is described below with reference to FIGS. 3 through 16. The embodiment described below is simply an example, and does not intend to exclude the application of variations and modifications not clearly described below. That is, the present embodiment may be realized in many variations within the scope of the gist of the present embodiment.

Embodiments

Figure 3:
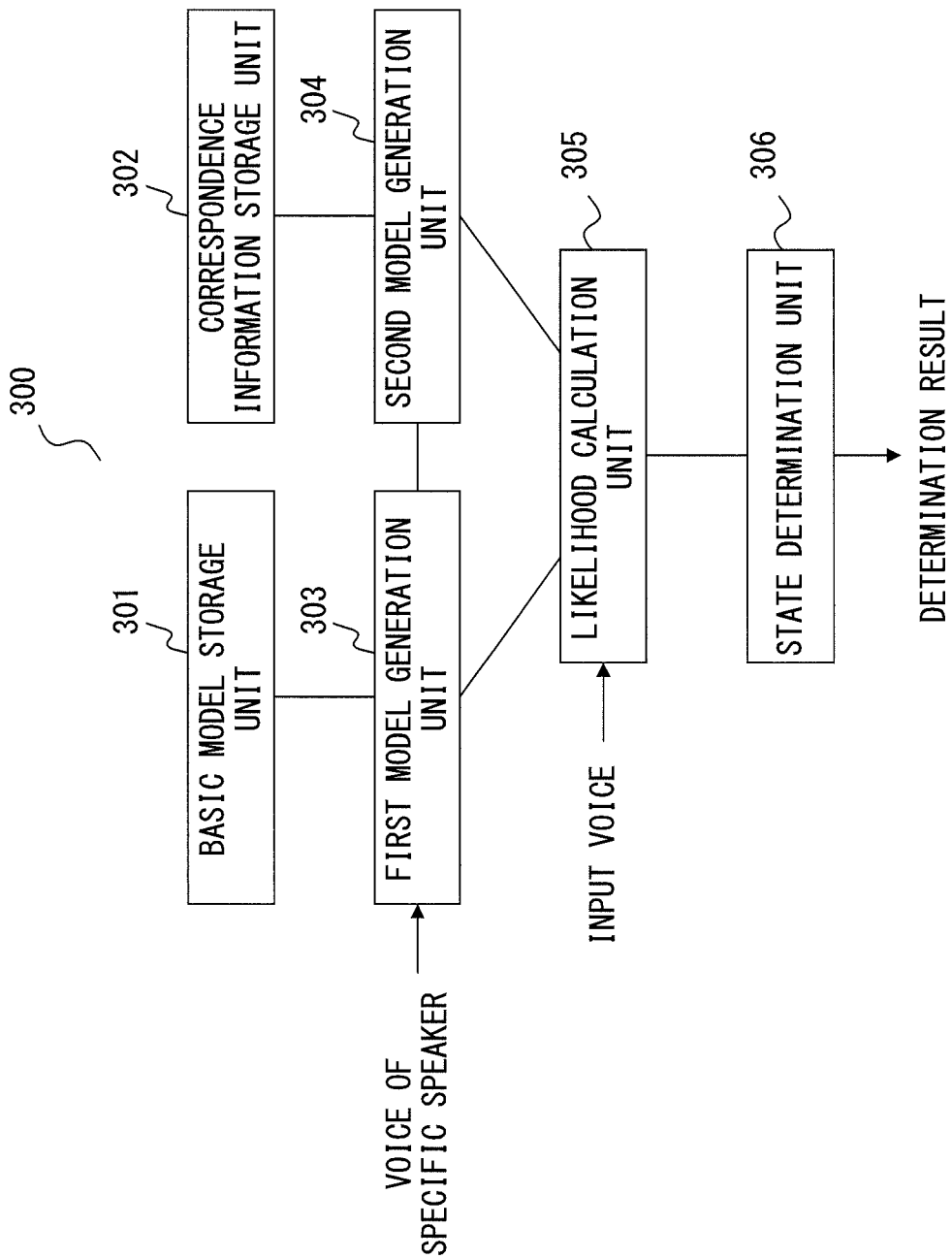
FIG. 3 is an explanatory view of a state detection device 300.

FIG. 3 is an explanatory view of the state detection device 300 according to an embodiment of the present invention.

The state detection device 300 includes a basic model storage unit 301, a correspondence information storage unit 302, a first model generation unit 303, a second model generation unit 304, a likelihood calculation unit 305, and a state determination unit 306.

The basic model storage unit 301 is a storage device for storing a basic model obtained by modeling the feature of voice acquired from a plurality of unspecific speakers. The basic model is, for example, information which may be defined using the GMM etc.

The correspondence information storage unit 302 is a storage device for storing the correspondence information about the correspondence between the first unspecific speaker model and the second unspecific speaker model. The first unspecific speaker model is information obtained by modeling the feature of the voice of unspecific speakers in the undepressed state. In addition, the second unspecific speaker model is the information obtained by modeling the feature of the voice of unspecific speakers in the depressed state. The first unspecific speaker model and the second unspecific speaker model may be, for example, defined using the GMM etc. Therefore, the correspondence between the first unspecific speaker model and the second unspecific speaker model may be expressed by, for example, a parameter included in the GMM. The first model generation unit 303 extracts the feature of the voice of a specific speaker in the undepressed state, and adjusts the basic model so that it expresses the extracted feature, thereby generating the first specific speaker model obtained by modeling the feature of the voice of a specific speaker in the undepressed state. For example, the first model generation unit 303 adjusts the parameter included in the basic model so that it indicates the feature of the voice of a specific speaker in the undepressed state.

The second model generation unit 304 reflects the amount of displacement from the first unspecific speaker model to the second unspecific speaker model according to the correspondence information on the first specific speaker model. Thus, the second model generation unit 304 generates the second specific speaker model obtained by modeling the feature of the voice of a specific speaker in the depressed state. For example, the second model generation unit 304 reflects the amount of displacement from the parameter included in the first unspecific speaker model to the parameter included in the second unspecific speaker model on the parameter included in the first specific speaker model.

The likelihood calculation unit 305 calculates the first likelihood as the likelihood of the first specific speaker model with respect to the feature of input voice and the second likelihood as the likelihood of the second specific speaker model with respect to the input voice.

The state determination unit 306 determinates the state of the speaker of the input voice based on the first likelihood and the second likelihood.

As described above, the state detection device 300 generates the first specific speaker model obtained by modeling the feature of the voice of a specific speaker in the undepressed state from the voice of the specific speaker in the undepressed state. Then, the state detection device 300 generates the second specific speaker model obtained by modeling the feature of the voice of the specific speaker in the depressed state from the first specific speaker model according to the correspondence information.

Thus, the state detection device 300 determinates the state of the input voice using the first specific speaker model specified for a specific speaker and the abnormal state model for a specific speaker generated from the first specific speaker model. As a result, the state detection device 300 can detect the state of the specific speaker with high accuracy.

In addition, since the state detection device 300 generates the second specific speaker model from the first specific speaker model according to the correspondence information, it may not be necessary to generate the second specific speaker model from the voice of the specific speaker in the depressed state. As a result, the state detection device 300 can suppress the load imposed at the enrolment of the voice of the user.

Other Embodiments

Figure 4:
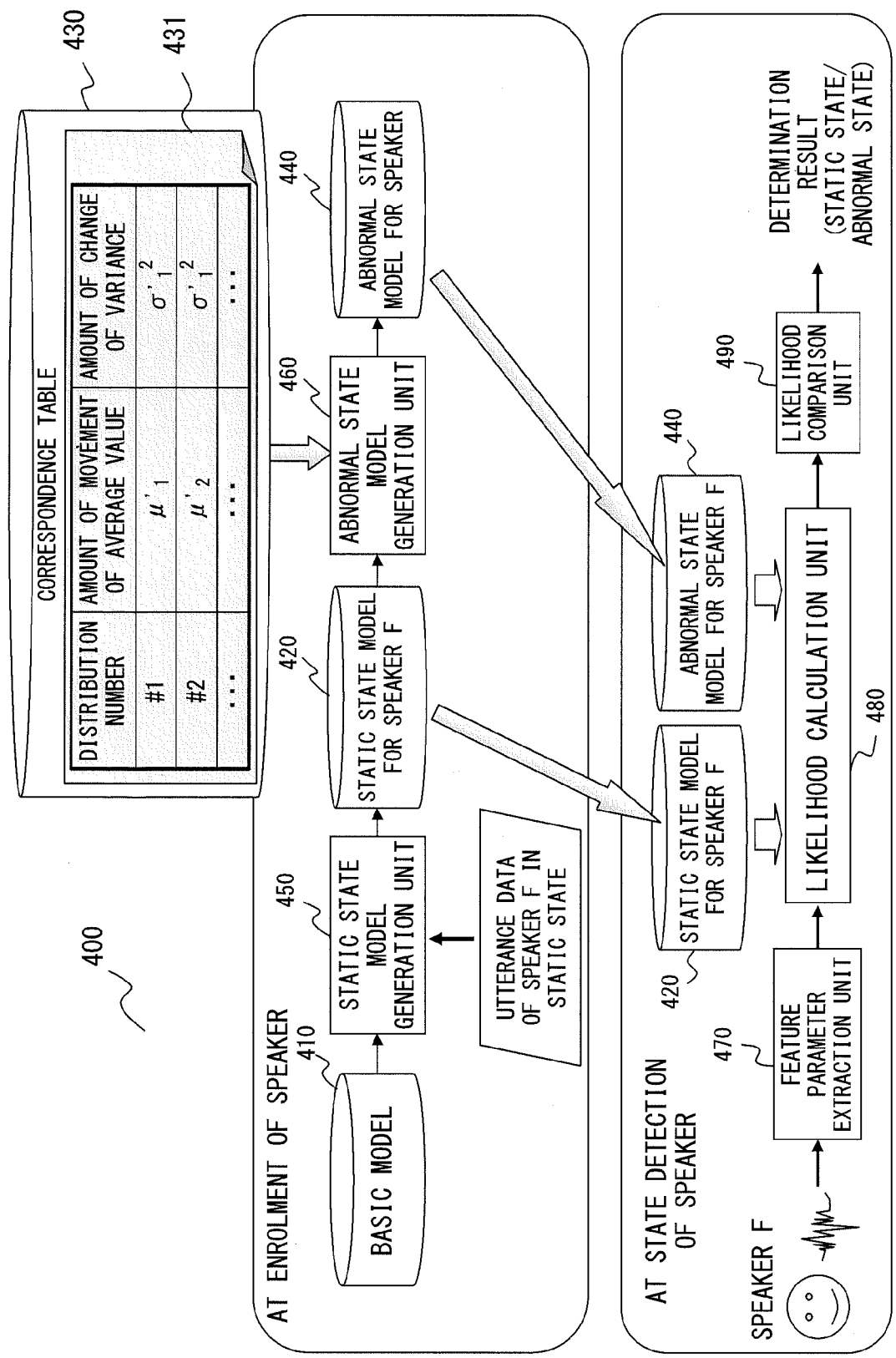
FIG. 4 is an explanatory view of a state detection device 400.

FIG. 4 is an explanatory view of a state detection device 400 according to an embodiment of the present invention.

The state detection device 400 includes storage units 410 through 440, a static state model generation unit 450, an abnormal state model generation unit 460, a feature parameter extraction unit 470, a likelihood calculation unit 480, and a likelihood comparison unit 490.

In FIG. 4, a device to be used is described for each of the processes for an "enrolment of a speaker" and "detection of the state of a speaker" for comprehensibility of the state detection device 100. However, it is not to limit the configuration of the state detection device 400, for example, the arrangement of the devices, the connection among the devices, etc. Also in FIG. 4, the storage units 410 through 440 are described as different storage units, but it is obvious that the storage units 410 through 440 may be realized as one storage unit.

The storage unit 410 is a storage device for storing a basic model generated in advance. The basic model is a model generated by quantizing the feature parameter extracted from among a large amount of utterance data acquired from unspecific speakers using the GMM.

In the present embodiment, non-linguistic information included in a voice waveform is used as a feature parameter. The non-linguistic information refers to the information other than the information needed for the recognition of a linguistic information included in a voice waveform. For example, the information relating to a pulse signal generated when a speaker utters his or her voice, the information relating to a change with time of a pulse signal generated when a speaker utters his or her voice, etc. may be used as a feature parameter. However, it is not the gist of the present embodiment to eliminate the use of the information needed for the recognition of a linguistic information included in a voice waveform.

As the information relating to the pulse signal generated when a speaker utters voice, the logarithm LPC residual power obtained from the LPC residual signal about the speech data of the speaker may be used. In addition, as the information relating to the change with time of the pulse signal generated when the speaker utters voice, the $\Delta$ logarithm LPC residual power obtained from the LPC residual signal about the speech data of the speaker may be used.

In the present embodiment, as a feature parameter, the logarithm LPC residual power and the $\Delta$ logarithm LPC residual power are used, but it is not to limit the feature parameter to the logarithm LPC residual power and the $\Delta$ logarithm LPC residual power. The feature parameter may be non-linguistic information included in the voice waveform of a speaker.

For example, as a feature parameter, the information about the intonation of speech may be used. It is to use the inclination that a speaker utters words with his or her intonation in a relaxed state, but he or she utters words with his or her intonation suppressed unconsciously when the speaker feels stressed. As the information relating to the intonation of a speech, a pitch frequency obtained from the speech data of a speech may be used.

Furthermore, the information about the intensity of voice may be used as a feature parameter. It is to use as a feature the inclination that the supply of energy to vocal cords decreases when the speaker feels stressed. The value indicating the flatness with respect to the LPC residual spectrum in a high frequency band, for example, a geometric average and an arithmetic average may be used as the information about the intensity of voice.

The storage unit 420 is a storage device for storing a static state model for a specific speaker indicating the speech features of a specific speaker in the static state. The storage unit 440 is a storage device for storing a abnormal state model for a specific speaker indicating the speech features in the abnormal state of a specific speaker.

The static state refers to a reference state for determination of the abnormal state. For example, the voice uttered by a user etc. of the state detection device 400 in the state which is determined as the static state may be used as the voice in the static state. Therefore, the voice uttered by a user etc. of the state detection device 400 in the state which is determined as different from the static state may be used as the voice in the abnormal state.

The storage unit 430 is a storage device for storing the correspondence table 431 indicating the correspondence between the static state model for unspecific speakers and the abnormal state model for unspecific speakers. In the correspondence table 431 according to the present embodiment, an average value and a variance are used in the parameters included in the GMM. Therefore, the information obtained by storing for each distribution the amount of movement of an average value and the amount of change of a variance when the static state model for unspecific speakers and the abnormal state model for unspecific speakers are compared with each other may be included in the correspondence table 431.

The correspondence table 431 refers to the information about the amount of displacement from the static state model for unspecific speakers to the abnormal state model for unspecific speakers. Therefore, the abnormal state model for a specific speaker can be easily predicted from the static state model for a specific speaker using the amount of displacement indicated by the correspondence table 431.

For example, when the average value of the distribution of the distribution numbers #1, #2, . . . in the static state model for a specific speaker is adjusted by $\mu_1'$, $\mu_2'$, . . . , and the variance of the distribution is adjusted by $\sigma_1'^2$, $\sigma_2'^2$, . . . , the abnormal state model for a specific speaker may be obtained.

In the present embodiment, the average value and the variance in the parameters included in the GMM are used in the correspondence table 431, but the correspondence table 431 may also include, for example, the amount of change in weight of distribution which is one of the parameters included in the GMM.

(Enrolment of Speaker)

Described below is the outline of the operation of the state detection device 400 at the enrolment of a speaker.

For example, when the utterance data of the speaker F in the static state is input, the static state model generation unit 450 generates the static state model for a specific speaker about the speaker F by adapting the basic model to utterance data of the speaker F in the static state. Then, the static state model generation unit 450 stores the generated static state model for a specific speaker in the storage unit 420.

Furthermore, the abnormal state model generation unit 460 generates the abnormal state model for a specific speaker about the speaker F by performing an adjustment of the average value and the variance in the parameters included in the static state model for a specific speaker about the speaker F based on the correspondence table 431. Then, the abnormal state model generation unit 460 stores the generated abnormal state model for a specific speaker in the storage unit 440. Thus, the enrolment of the speaker F is completed.

(Detection of State of Speaker)

Described below is the operation of the state detection device 400 when the state of a speaker is detected.

For example, when the utterance data of the speaker F is input, the feature parameter extraction unit 470 extracts a feature parameter from the input utterance data of the speaker F. Then, the likelihood calculation unit 480 reads the static state model for a specific speaker about the speaker F from the storage unit 420. Then, the likelihood calculation unit 480 calculates the likelihood of the static state model for a specific speaker about the speaker F with respect to the feature parameter extracted by the feature parameter extraction unit 470. Similarly, the likelihood calculation unit 480 reads the abnormal state model for a specific speaker about the speaker F from the storage unit 440. Then, the likelihood calculation unit 480 calculates the likelihood of the abnormal state model for a specific speaker about the speaker F with respect to the feature parameter extracted by the feature parameter extraction unit 470.

The likelihood comparison unit 490 compares the two likelihoods, which have been calculated by the likelihood calculation unit 480, with each other, and determines the state of the speaker F, that is, whether the speaker F is in the static state or in the abnormal state. Then, the likelihood comparison unit 490 outputs the determination result to a specified device etc. Thus, the state detection of the speaker F is completed.

Figure 5:
FIG. 5 is a practical example of a correspondence table 431.

FIG. 5 is a practical example of the correspondence table 431.

The correspondence table 431 includes the amount of movement of an average value and the amount of change in variance for each distribution included in the GMM. The correspondence table 431 illustrated in FIG. 5 exemplifies the case in which the average value and the variance refer to two-dimensional values. However, the correspondence table 431 is not intended for limitation to the case in which the average value and the variance are two-dimensional.

The amount of movement of the average value refers to the amount of movement from the average value of the static state model for unspecific speakers to the average value of the abnormal state for unspecific speakers when the static state model for unspecific speakers is compared with the abnormal state model for unspecific speakers. The amount of change in variance refers to the amount of change from the variance of the static state model for unspecific speakers to the variance of the abnormal state for unspecific speakers when the static state model for unspecific speakers is compared with the abnormal state model for unspecific speakers.

FIG. 6 is an explanatory view of generating a static state model for a specific speaker and an abnormal state model for a specific speaker according to the present embodiment. The items (1) and (2) in FIG. 6 correspond to the following items (1) and (2). The reference numerals #1 through #3 of the coordinates 601 and 602 indicate the distribution numbers.

(1) Generating a Static State Model for Specific Speaker

For example, assume that the basic model is expressed by the distribution enclosed by the dotted circle in the coordinates 601. When the static state utterance data of the speaker F is input, the static state model generation unit 450 extracts a feature parameter from the static state utterance data of the speaker F. The feature vector included in the extracted feature parameter indicates the distribution as illustrated by the • in the coordinates 601. The feature vector is described in detail as described later with reference to FIG. 7.

The static state model generation unit 450 estimates the static state model for a specific speaker about the speaker F by performing the Bayesian adaptation to the basic model using the feature parameter extracted from the static state utterance data of the speaker F. The Bayesian adaptation is well known by the non-patent document 3 etc. By the Bayesian adaptation, the distribution of the static state model for a specific speaker about the speaker F, for example, the distribution b enclosed by the circle of the solid line in the coordinates 601, is estimated from the distribution a of the basic model.

(2) Generating an Abnormal State Model for Specific Speaker

When the estimation of the static state model for a specific speaker about the speaker F is completed, the abnormal state model generation unit 460 adjusts the average value and the variance among the parameters included in the GMM expressing the static state model for a specific speaker about the speaker F according to the correspondence table 431. Thus, the distribution of the abnormal state model for a specific speaker about the speaker F, for example, the distribution c enclosed by the circle of the long and short dashed lines in the coordinates 602, is estimated from the static state model for a specific speaker about the speaker F.

For example, when the distribution #1 in the coordinates 602 is considered, the average value of the distribution b is adjusted in the in the direction of x1 by −0.5 according to the correspondence table 431, and adjusted in the in the direction of x2 by 0.1. In addition, the variance of the distribution b is adjusted in the in the direction of x1 by −0.02 according to the correspondence table 431. As a result, the distribution such as the distribution c can be acquired from the distribution b.

In FIG. 6, the case in which the feature vector refers to a two-dimensional value is described for simple explanation, but it is not to limit the case to the two-dimensional feature vector. In addition, although only three distributions, that is, the distributions #1 through #3, are illustrated in FIG. 6, it is only the exemplification, and is not to limit to the case in which three distributions are used.

(Practical Process at Enrolment of Speaker)

Figure 7:
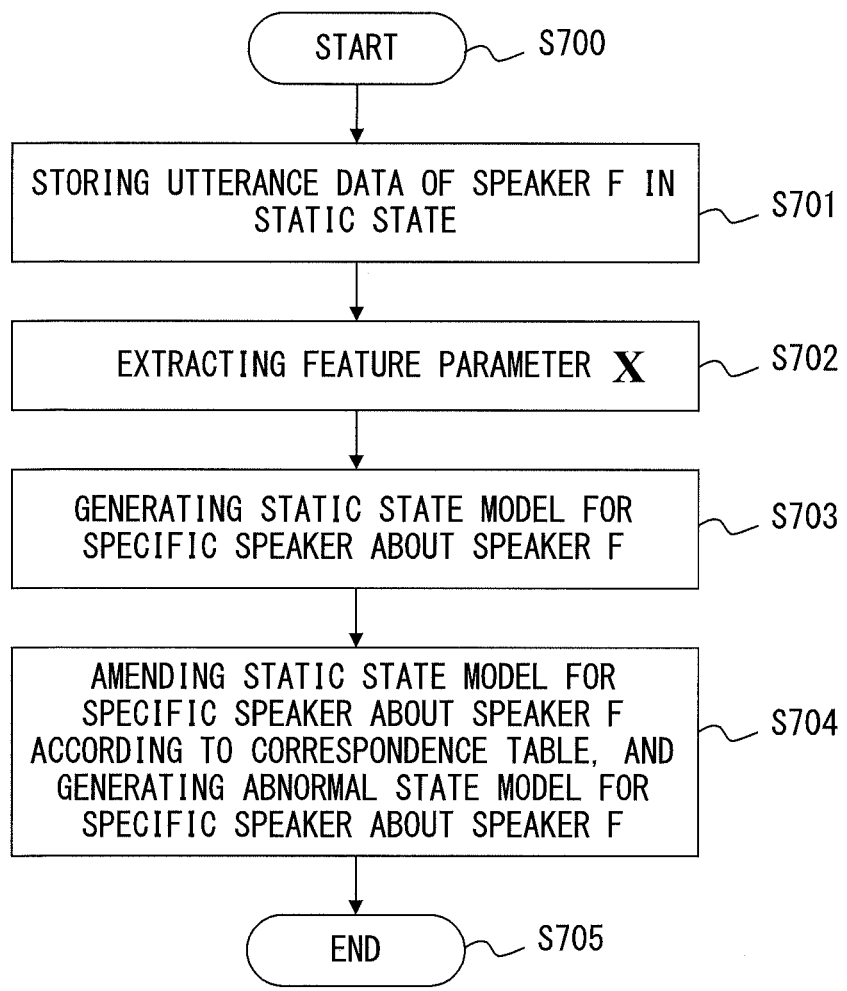
FIG. 7 is a flowchart of the process performed when a speaker is enrolled.

FIG. 7 is a flowchart of the process performed when a speaker is enrolled according to the present embodiment.

When the user performs a specified operation through an input device etc. provided for the state detection device 400, the state detection device 400 starts the following processes (step S700).

In step S701, the state detection device 400 digitizes the voice of the speaker acquired through the microphone etc. provided for the state detection device 400, and generates utterance data. Then, the state detection device 400 stores the generated utterance data in the storage etc.

In step S702, the state detection device 400 extracts the feature parameter X from the utterance data generated in step S701. The feature parameter X may be extracted as follows according to, for example, section 1.2 of the non-patent document 1.

First, the state detection device 400 frames the utterance data generated in step S701. In the framing process, the state detection device 400 retrieves a signal for each section having a specified frame length of N from the signal sequence of utterance data. In this case, the state detection device 400 determines the next section by making a shift by the frame shift length T so that a certain section overlaps the next section by a specified period. For example, the value of about 20 through 40 ms may be used as the frame length of N, and the value of about 10 through 20 ms may be used as the frame shift length of T.

Next, the state detection device 400 calculates the product of the signal sequence s(n) of the framed utterance data and the weight called a analysis window by the following equation, thereby obtaining the signal sequence $S_W(m; l)$. A hamming window w (l) may be used as an analysis window.

When the state detection device 400 performs an operation by the equation, for example, a DSP 1501 described later operates and changes the data stored in memory according to the program instruction including the algorithm depending on the equation, thereby generating a specified operation result.

$$S_w(m; l) = \sum_{m=0}^{N-1} w(m) \cdot s(k_l + m) \quad (1)$$

$$(k_0 = 0, k_1 = T, k_2 = 2T, \ldots, k_l = lT)$$

where the hamming window w(n) may be expressed by the following equation.

$$w(n) = 0.54 - 0.46\cos\left(\frac{2n\pi}{N-1}\right) \quad (2)$$

$$(n = 0, 1, \ldots, N-1)$$

In the equation (1) above, the subscript l corresponds to the position from which a signal is to be retrieved. Therefore, by increasing l at the intervals of the frame shift length of T, the signal sequence $S_W(n)$ (n=0, 1, ..., N−1) whose frame length of N is framed may be acquired.

Next, the state detection device 400 extracts the feature parameter from the framed signal sequence $S_W(n)$. In the present embodiment, the parameter relating to the intensity of the pulse signal detected when a speaker utters voice and the change with time of the pulse signal detected when the speaker utters voice is extracted as a feature parameter.

Described below is the case in which the logarithm LPC residual power is used as the parameter relating to the intensity of the pulse signal detected when a speaker utters voice, and the Δ logarithm LPC residual power is used as the parameter relating to the change with time of the pulse signal detected when the speaker utters voice. The LPC residual signal may be obtained by using the descriptions in the section 1.2.2 in the non-patent document 1.

Assume that the linear predictive coefficient when the voice is regulated by a transfer function of all pole model is defined as $a_i$ (i=1, 2, ..., p). The linear predictive coefficient $a_i$ may be obtained by a well-known method such as the Levinson-Durbin method.

When the calculation of the linear predictive coefficient $a_i$ is completed, the state detection device 400 calculates the estimated value of $S_W(n)$ from p prior samples.

$$\hat{S}_w(n) = \sum_{i=0}^{p} a_i \cdot s_w(n-i) \quad (3)$$

$$(n = 0, 1, \ldots, N-1)$$

The LPC residual signal e (n) may be obtained by the difference between the estimated value obtained by the equation (3) and the $S_W(n)$ obtained by the actually observed voice. Therefore, the state detection device 400 calculates the LPC residual signal e (n) by the following equation.

$$e(n) = s_w(n) - \hat{S}_w(n). \quad (4)$$

The state detection device 400 calculates the logarithm power of the LPC residual signal in the frame l, that is, the logarithm LPC residual power in the frame l, by the following equation.

$$\text{power}(l) = \log_{10}\left(\sum_{n=0}^{N-1} e_l^2(n)\right) \quad (5)$$

The state detection device 400 calculates the Δ logarithm LPC residual power by the following equation.

$$\Delta\text{power}(l) = \frac{\left|\sum_{k=-2}^{2} k \cdot \text{power}(l+k)\right|}{\sum_{k=-2}^{2} k^2} \quad (6)$$

Δ is called a dynamic feature, and may be obtained as a regression coefficient of a change of logarithm power along the time axis. For example, in (1.21) of the section 1.3.1 of the non-patent document 1, an example of obtaining a cepstrum coefficient as a regression coefficient is described. The numerator in the right side is an absolute value to use the amount of change of logarithm LPC residual power for the feature parameter according to the present embodiment.

The two parameters obtained as described above, that is, the logarithm LPC residual power in the frame 1 and the Δ logarithm LPC residual power in the frame 1, may be expressed using the two-dimensional vector $X_l$. The vector $X_l$ is called a "feature vector". Furthermore, the entire sequence of the feature vector is referred to as a "feature parameter X".

When the feature parameter X is completely extracted, the state detection device 400 passes control to step S703.

In Step 703, the state detection device 400 generates a static state model for a specific speaker about the speaker F. The static state model for a specific speaker according to the present embodiment may be expressed using the GMM. Therefore, in step S703, the model parameter $\lambda_{calm\_user}$ included in the static state model for a specific speaker about the speaker F is obtained as described below.

In step S702, assume that $T_{calm\_user}$ frames are generated from the utterance data in the static state of the speaker F. In this case, the state detection device 400 calculates the number of frames in the sense of probability corresponding to the Bayesian adaptation with respect to the feature parameter obtained in step S702. $\lambda_{gen}$ refers to a basic parameter of the GMM described later. In addition, K refers to the number of normal distributions included in the GMM.

$$n_{1,i} = \sum_{l=1}^{T_{calm\_user}} p(i \mid x_l, \lambda_{gen}) \quad (7)$$

The state detection device 400 calculates the primary moment by the following equation.

$$E_{1,i}(x) = \frac{1}{n_{1,i}} \sum_{l=1}^{T_{calm\_user}} p(i \mid x_l, \lambda_{gen}) \cdot x_l \quad (8)$$

The state detection device 400 calculates the secondary moment by the following equation.

$$E_{1,i}(x^2) = \frac{1}{n_{1,i}} \sum_{l=1}^{T_{calm\_user}} p(i \mid x_l, \lambda_{gen}) \cdot x_l^2 \quad (9)$$

The data dependent adaptive coefficient $\alpha_{1,i}^\rho$, $\rho=\{w, m, v\}$ is obtained by the following equation using the parameter $\gamma$ for adjustment of the level of the adaptation called the "Bayesian factor". $\rho$ is an index (subscript) indicating the weight (w), the average value (m), or the variance (v), but is not a numeric.

$$\alpha_{1,i}^\rho = \frac{n_{1,i}}{n_{1,i} + r^\rho} \quad (10)$$

Then, the state detection device 400 calculates the model parameter included in the GMM, that is, the weight $p_{1,i}$, average value $\mu_{1,i}$, and the variance $\sigma_{1,i}^2$ of each Gaussian probabilistic density function included in the GMM, by the following equation.

$$p_{1,i} = \left\{\alpha_{1,i}^w \cdot \frac{n_{1,i}}{T_{calm\_user}} + (1 - \alpha_{1,i}^w) \cdot p_{0,i}\right\} \cdot \gamma_1 \quad (11)$$

$$\mu_{1,i} = \alpha_{1,i}^m \cdot E_{1,i}(x) + (1 - \alpha_{1,i}^m) \cdot \mu_{0,i} \quad (12)$$

$$\sigma_{1,i}^2 = \alpha_{1,i}^v \cdot E_{1,i}(x^2) + (1 - \alpha_{1,i}^v) \cdot (\sigma_{0,i}^2 + \mu_{0,i}^2) - \mu_{1,i}^2 \quad (13)$$

$\gamma_1$ refers to a scale factor constant for amendment so that the total of the weights $p_{1,i}$ of all Gaussian probabilistic density functions included in the GMM may be 1.0. The scale factor constant $\gamma_1$ may be obtained by the following equation.

$$\gamma_1 = \frac{1}{\sum_{k=1}^{K} p_{1,k}} \quad (14)$$

The state detection device 400 may calculate the model parameter $\lambda_{calm\_user}$ of the static state model for a specific speaker about the speaker F by performing only once the calculation above.

$$\lambda_{calm\_user} = \{p_{1,k}, \mu_{1,k}, \sigma_{1,k}^2\} k=1,2,\ldots,K \quad (15)$$

By the processes above, the static state model for a specific speaker about the speaker F is generated.

When the static state model for a specific speaker about the speaker F is completely generated, the state detection device 400 stores the model parameter $\lambda_{calm\_user}$ of the static state model for a specific speaker about the speaker F in the storage unit 420. Then, the state detection device 400 passes control to step S704.

In step S704, the state detection device 400 generates the abnormal state model for a specific speaker about the speaker F by amending the model parameter $\lambda_{calm\_user}$ of the static state model for a specific speaker about the speaker F obtained in step S703 according to the correspondence table 431. The state detection device 400 calculates the average value and the variance '$\mu_{1,i}^2$ included in the model parameter $\lambda_{abn\_user}$ of the abnormal state model for a specific speaker about the speaker F by the following equation. In the present embodiment, the weight $p_{1,i}$ included in the model parameter $\lambda_{calm\_user}$ obtained in step S703 is used for the weight $'p_{1,i}$ included in the model parameter $\lambda_{abn\_user}$.

The state detection device 400 calculates the average value $'\mu_{1,i}$ by the following equation.

$$'\mu_{1,i} = \mu_{1,i} + \mu_i'  \quad (16)$$

The state detection device 400 also calculates the variance $'\sigma_{1,i}^2$ by the following equation (18) if the expression (17) holds.

$$\sigma_{1,i}^2 + \sigma_i'^2 \geq \beta \cdot \sigma_{1,i}^2 \quad (17)$$

$$'\sigma_{1,i}^2 = \sigma_{1,i}^2 - \sigma_i'^2 \quad (18)$$

The state detection device 400 also calculates the variance $'\sigma_{1,i}^2$ by the following equation (20) if the expression (19) holds.

$$\sigma_{1,i}^2 + \sigma_i'^2 < \beta \cdot \sigma_{1,i}^2 \quad (19)$$

$$'\sigma_{1,i}^2 = \beta \cdot \sigma_{1,i}^2 \quad (20)$$

where, for example, $\beta$ may be set to 0.1 ($\beta=0.1$) because the width of the reduction of the variance of the abnormal state model for a specific speaker with respect to the static state model for a specific speaker is suppressed to 1/10 of the variance of the static state model for a specific speaker, thereby preventing the high probability of over-learning state on a specific value.

By the processes above, the state detection device 400 obtains the model parameter $\lambda_{abn\_user}$ of the abnormal state model for a specific speaker about the speaker F. Therefore, it is considered that the abnormal state model for a specific speaker about the speaker F has been generated.

$$\lambda_{abn\_user} = \{p_{1,k}, '\mu_{1,k}, '\sigma_{1,k}^2\} k=1,2,\ldots,K \quad (21)$$

In the present embodiment, the weight of the variance of the static state model for a specific speaker is used as is for the weight $'p_i$ of the distribution of the abnormal state model for a specific speaker. However, the weight $'p_i$ of the distribution of the abnormal state model for a specific speaker may be amended using an amount of change from the weight $p_{2,i}$ of the distribution of the static state model for unspecific speakers to the weight $p_{3,i}$ of the distribution of the abnormal state model for unspecific speakers as by the following equation. The weight $p_{2,i}$ of the distribution of the static state model for unspecific speakers and the weight $p_{3,i}$ of the distribution of the abnormal state model for unspecific speakers are described later with reference to FIG. 11.

$$'p_i = p_{1,i} + p_i' \quad (22)$$

In this case, since a negative weight makes no sense, $'p_i$ is set to 0 ($'p_i=0$) when $'p_i \leq 0$.

When the processes above are completed, the state detection device 400 stores the model parameter $\lambda_{abn\_user}$ of the abnormal state model for a specific speaker about the speaker F in the storage unit 440. Then, the state detection device 400 terminates the process performed at the enrolment of the speaker (step S705).

(Practical Process when State of Speaker is Detected)

Figure 8:
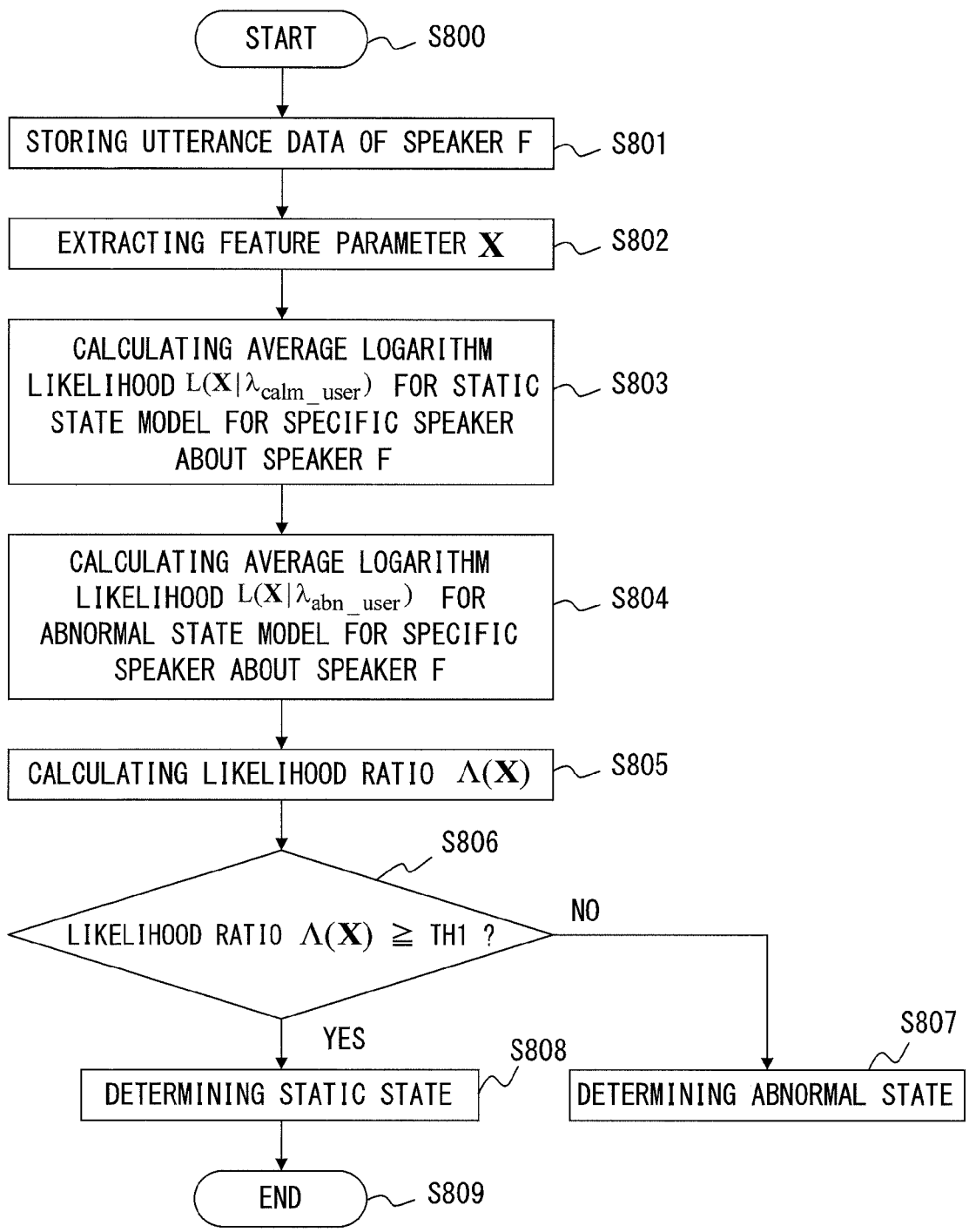
FIG. 8 is a flowchart of the process of detecting the state of a speaker.

FIG. 8 is a flowchart of the process of detecting the state of a speaker according to the present embodiment.

In step S801, according to instructions of a user, the state detection device 400 digitizes the voice of the speaker F acquired through the microphone etc. provided for the state detection device 400, and generates utterance data. Then, the state detection device 400 stores the generated utterance data in the storage etc.

In step S802, the state detection device 400 extracts the feature parameter X from the utterance data generated in step S801. The feature parameter X may be extracted by the same process as described above in step S702 in FIG. 7. Therefore, the description of the extraction of the feature parameter X is omitted here.

In step S803, the state detection device 400 calculates the average logarithm likelihood L ($X|\lambda_{calm\_user}$) of the feature parameter X extracted in step S802 to the static state model for a specific speaker about the user F by the following equation.

$$L(X | \lambda_{calm\_user}) = \frac{1}{T}\sum_{i=1}^{T} \log p(x_i | \lambda_{calm\_user}) \quad (23)$$

In step S804, the state detection device 400 calculates the average logarithm likelihood L ($X|\lambda_{abn\_user}$) of the feature parameter X extracted in step S802 to the abnormal state model for a specific speaker about the user F by the following equation.

$$L(X | \lambda_{abn\_user}) = \frac{1}{T}\sum_{i=1}^{T} \log p(x_i | \lambda_{abn\_user}) \quad (24)$$

In step S805, the state detection device 400 calculates the ratio of the average logarithm likelihood L ($X|\lambda_{calm\_user}$) calculated in step S803 to the average logarithm likelihood L ($X|\lambda_{abn\_user}$) calculated in step S804, that is, the likelihood ratio $\Lambda$ (X), by the following equation.

$$\Lambda(X) = L(X|\lambda_{calm\_user}) - L(X|\lambda_{abn\_user}) \quad (25)$$

When the likelihood ratio $\Lambda$ (X) calculated in step S805 is smaller than the threshold TH1 (NO in step S806), the state detection device 400 determines that the speaker F is in the abnormal state (step S807). In this case, the state detection device 400 outputs the determination result that the speaker F is in the abnormal state to a specified device. Furthermore, when the likelihood ratio $\Lambda$ (X) calculated in step S805 is equal to or exceeds the threshold TH1 (YES in step S806), the state detection device 400 determines that the speaker F is in the static state (step S808). In this case, the state detection device 400 outputs the determination result that the speaker F is in the normal state to a specified device.

When the process above is terminated, the state detection device 400 terminates the process of detecting the state of the speaker (step S809).

(Advance Preparation)

To detect the state of a speaker using the state detection device 400 according to the present embodiment, it may be necessary to make a specified advance preparation. In the advance preparation, the correspondence table 431 for use in state detection is generated.

The advance preparation may be performed by an information processing device 900 capable of communicating data with the state detection device 400. In this case, the information processing device 900 may directly communicate data by connecting the devices through a network or a dedicated line, or may communicate data through a storage medium. Furthermore, the state detection device 200 itself may perform the advance preparation.

The advance preparation is described below with reference to FIGS. 9 and 10.

Figure 9:
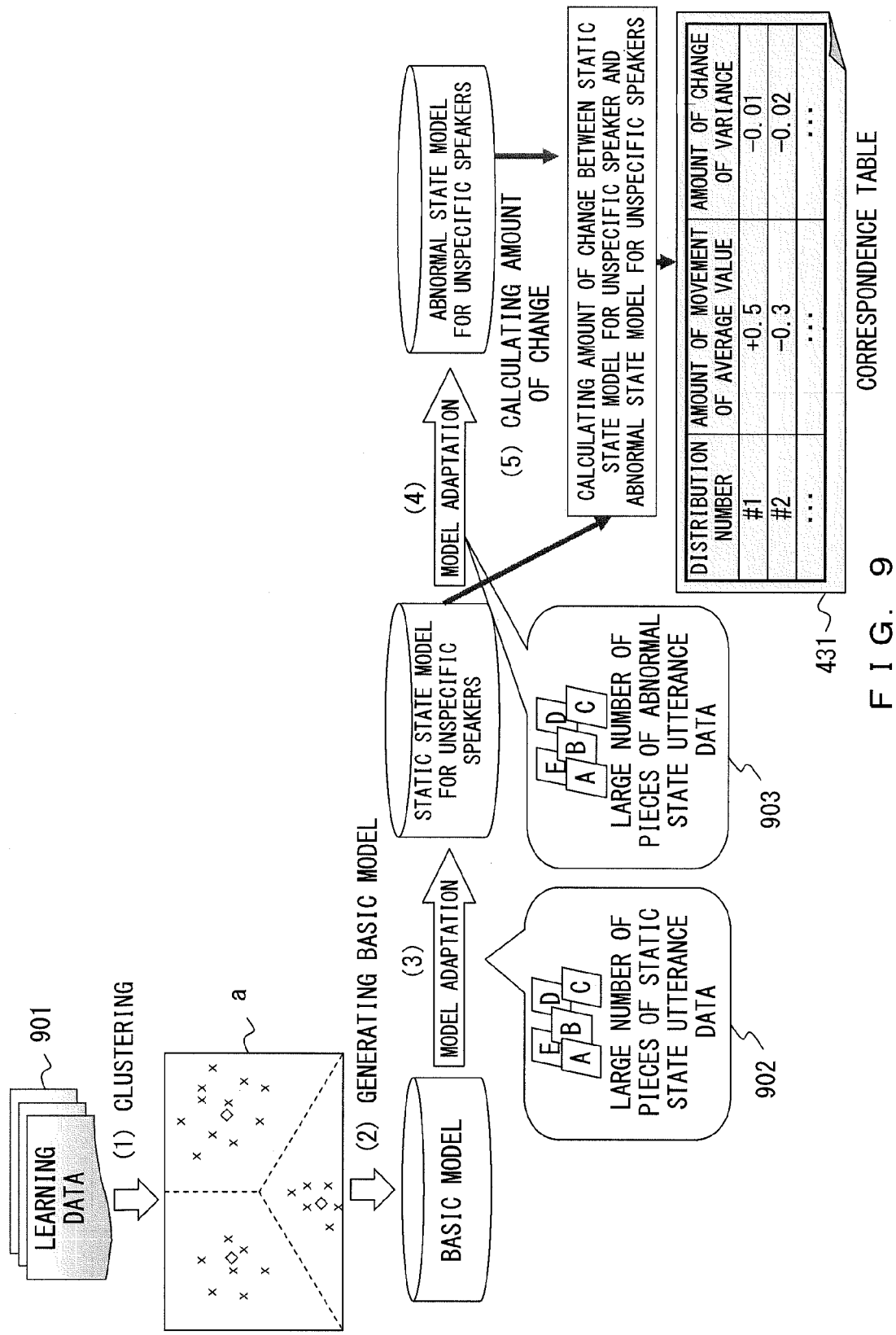
FIG. 9 is an explanatory view of the outline of an advance preparation.

FIG. 9 is an explanatory view of the outline of the advance preparation according to the present embodiment. FIG. 10 is an explanatory view of the outline of the process performed in the advance preparation illustrated in FIG. 9. The items (1) through (5) described below correspond to the items (1) through (5) described in FIG. 9.

(1) Clustering

In the advance preparation, learning data 901 prepared in advance is used to generate a basic model. A voice database used in generating an acoustic model for use in speech recognition may be used as the learning data 901. The acoustic model may include the features extracted from the waveform data of various voices.

When the information processing device 900 is provided with the learning data 901, it extracts a feature parameter from the learning data 901. Then, the information processing device 900 performs the clustering on the extracted feature parameter, and divides the feature vectors included in the feature parameter into a plurality of clusters as illustrated by a in FIG. 9.

Figure 10:
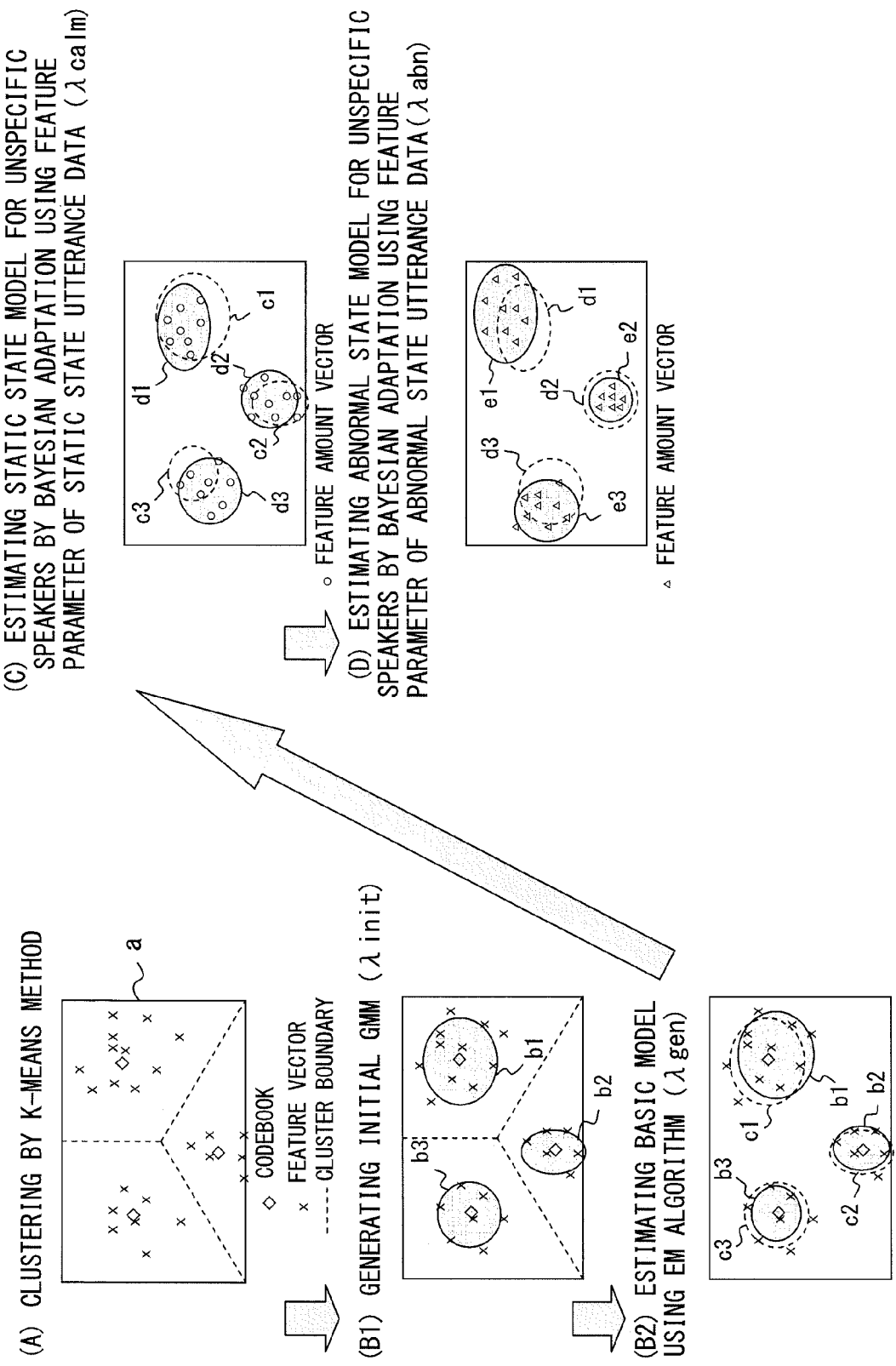
FIG. 10 is an explanatory view of the outline of the process performed in an advance preparation as illustrated in FIG. 9.

For the clustering, for example, a K-means method may be used as illustrated by (A) in FIG. 10. In the "a" in FIGS. 9 and 10, the mark x indicates a feature vector included in the feature parameter, and the mark ◇ indicates a codebook vector. The broken lines indicate the boundary of the clusters. The feature vectors included in the feature parameter are divided into a plurality of clusters by the clustering by the K-means method. Each cluster includes a plurality of feature vectors centering the codebook vector. The "a" in FIGS. 9 and 10 illustrates an example of dividing the feature vectors into three clusters for simple illumination, but obviously it is not to limit the number of divided clusters.

(2) Generating Basic Model

When the clustering of the feature parameter is completed, the information processing device 900 calculates the model parameter $\lambda_{gen}$ of the GMM from the feature parameter divided into a plurality of clusters. The GMM specified by the calculated model parameter $\lambda_{gen}$ is defined as a basic model. Practically, the following processes are performed.

First, the information processing device 900 calculates the model parameter $\lambda_{init}$ from the feature parameter divided into a plurality of clusters. Then, for example, an initial GMM including the distributions b1 through b3 illustrated by (B1) in FIG. 10 is generated from the feature parameter illustrated by (A) in FIG. 10.

Then, the information processing device 900 updates the model parameter $\lambda_{init}$ of the initial GMM until it converges on a specified value using the EM algorithm. The model parameter $\lambda_{init}$ which has converged on a specified value is defined as the model parameter $\lambda_{gen}$ of the basic model. As a result, for example, the basic model including the distributions c1 through c3 illustrated by (B2) in FIG. 10 is estimated from the initial GMM illustrated by (B1) in FIG. 10.

(3) Model Adaptation

When the basic model is completely generated, the information processing device 900 adapts the basic model to a large number of pieces of prepared static state utterance data 902, and calculates the model parameter $\lambda_{calm}$ of the static state model for unspecific speakers.

In the present embodiment, the Bayesian adaptation is used in adapting a basic model to a large number of pieces of static state utterance data 902. By the Bayesian adaptation using the feature parameter extracted from among the large number of pieces of static state utterance data 902, a static state model for unspecific speakers including the distributions d1 through d3 illustrated by (C) in FIG. 10 is estimated from, for example, the basic model illustrated by (B2) in FIG. 10. The mark ○ described in (C) in FIG. 10 indicates the feature vectors included in the feature parameter extracted from the static state utterance data of a learning speaker set.

(4) Model Adaptation

When the static state model for unspecific speakers is completely generated, the information processing device 900 adapts the static state model for unspecific speakers to a large number of pieces of the prepared abnormal state utterance data 903, thereby calculating a model parameter $\lambda_{abn}$ of the abnormal state model for unspecific speakers.

In the present embodiment, the Bayesian adaptation is used in the process of adapting the static state model for unspecific speakers to the large number of pieces of abnormal state utterance data 903. By the Bayesian adaptation using the feature parameter of the large number of pieces of abnormal state utterance data 903, an abnormal state model for unspecific speakers including the distributions e1 through e3 illustrated by (D) in FIG. 10 is estimated from, for example, the static state model for unspecific speakers illustrated by (C) in FIG. 10. The mark Δ described in (D) in FIG. 10 indicates a feature vector included in the feature parameter extracted from the abnormal state utterance data of the learning speaker set.

(5) Calculation of Amount of Change

When the static state model for unspecific speakers and the abnormal state model for unspecific speakers are completely generated, the information processing device 900 calculates the amount of change between the static state model for unspecific speakers and the abnormal state model for unspecific speakers. In the present embodiment, both the static state model for unspecific speakers and the abnormal state model for unspecific speakers are expressed by the GMM. Then, according to the present embodiment, the information processing device 900 calculates the amount of change for each distribution about the average value and a variance in the model parameter included in the GMM. As a result of the calculation, the correspondence table 431 is acquired.

(Practical Process in Advance Preparation)

Figure 11:
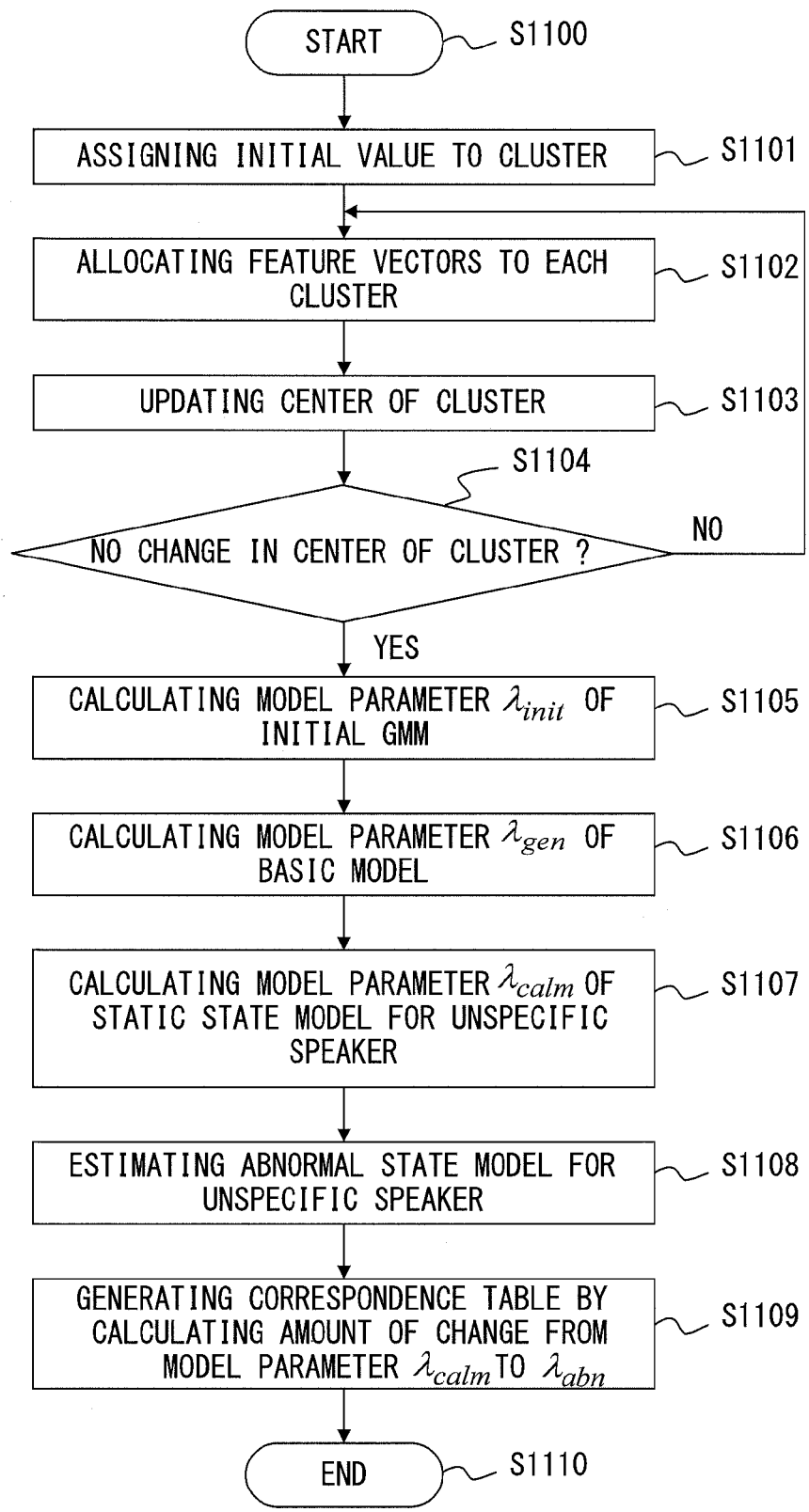
FIG. 11 is a flowchart of the process of an advance preparation.

FIG. 11 is a flowchart of the process of an advance preparation according to the present embodiment.

The following process may be performed according to the descriptions in sections 2.1 and 2.2 of the non-patent document 2.

In step S1101, the information processing device 900 assigns an initial value to a cluster. Practically, the information processing device 900 determines at random the initial value of a codebook vector $m_i$ (1) (i=1, 2, ..., K) which regulates the center of the cluster, and generates the codebook vector $m_i$ (1).

According to the present embodiment, K is set to 1024 (K=1024). In this case, the information processing device 900 selects at random 1024 vectors from among T feature vectors included in the feature parameter extracted from the learning data. Then, the information processing device 900 sets the selected 1024 feature vectors as the initial value of the codebook vector. However, it is not to limit the value of K to 1024 (K=1024).

In step S1102, the information processing device 900 assigns the feature vector to each cluster. Practically, the information processing device 900 assigns the feature vector other than the vector used as the initial value of the codebook vector $m_i$ (1) among the T feature vectors included in the feature parameter extracted from the learning data to the codebook vector $m_i$ (1) indicating the center of the closest cluster. The codebook vector $m_i$ (1) indicating the center of the cluster closest to the feature vector $X_i$ may be calculated by the following equation.

$$\text{index centering closest cluster} = \arg\min_{1 \le i \le K} \|x_l - m_i(1)\| \quad (26)$$

In step S1103, the information processing device 900 calculates the center of gravity of the feature vectors assigned to the cluster in step S1102. Then, the information processing device 900 updates the codebook vector $m_i(1)$ indicating the center of the cluster using the calculated center of gravity.

When the amount of update of the codebook vector $m_i(1)$ in step S1103 is equal to or exceeds the threshold, the information processing device 900 determines that the center of the cluster has changed (NO in step S1104). In this case, the information processing device 900 passes control to step S1102.

When the amount of update of the codebook vector $m_i(1)$ in step S1103 is smaller than the threshold, the information processing device 900 determines that there is no change in the center of the cluster (YES in step S1104). In this case, the information processing device 900 passes control to step S1105.

In step S1105, the information processing device 900 calculates the model parameter $\lambda_{init}$ of the initial GMM from the feature vectors assigned to each cluster by the processes in steps S1101 through S1104.

For example, the information processing device 900 calculates the average value $\mu_i$ of the feature vectors assigned to the cluster i. The information processing device 900 also calculates the variance $\sigma_i^2$ of the feature vectors assigned to the cluster i. In addition, the information processing device 900 calculates the ratio of the number of feature vectors assigned to the cluster i to the total number of feature vectors in the T feature vectors calculated from the learning data. The calculated ratio is used as the weight $p_i$ of the mixed distribution.

In step S1106, the information processing device 900 performs the following operation to calculate the model parameter $\lambda_{gen}$ of the basic model.

The operation described below may be performed using the EM algorithm described in, for example, the non-patent document 3 etc. Although, for the consistency of the description according to the present embodiment, "i" is used as an index indicating the frame number in the non-patent document 3, "l" not "i" is used as the index indicating the frame number in the present embodiment. Then, in the present embodiment, "i" is used as the index indicating the cluster number. Although "M" is used in the non-patent document 3 as the number of mixtures, "K" is used as the number of mixtures in the present embodiment. In the non-patent document 3, "N" is used as the number of dimensions, "D" is used as the number of dimensions in the present embodiment.

For example, the GMM of the number of mixtures K with respect to the feature vector $X_l$ of D dimensions in the frame l may be expressed by the following equation.

$$p(x_l \mid \lambda) = \sum_{i=1}^{K} p_i \cdot b_i(x_l) \quad (27)$$

where the probability density of the i-th Gaussian function to the D-dimensional feature parameter $X_l$ may be expressed by the following equation.

$$b_i(x_l) = \frac{1}{\sqrt[D/2]{2\pi}\sqrt{|\Sigma_i|}} \exp\left\{-\frac{1}{2}(x_l - \mu_i)' \sum_i^{-1} (x_l - \mu_i)\right\} \quad (28)$$

In the equation (28) above, $\Sigma$ indicates the covariance matrix of D×D. Assuming that only the diagonal components in the covariance matrix includes effective components, $\Sigma$ may be expressed by the following equation.

$$\sum_i = \begin{bmatrix} \sigma_{i,1}^2 & \cdots & 0 \\ \vdots & \ddots & \vdots \\ 0 & \cdots & \sigma_{i,D}^2 \end{bmatrix} \quad (29)$$

Therefore, the probability density of the i-th Gaussian function to the D-dimensional feature parameter $X_l$ may be expressed by the following equation.

$$b_i(x_l) = \frac{1}{\sqrt[D/2]{2\pi}\prod_{d=1}^{D}\sigma_{i,d}} \exp\left\{-\sum_{d=1}^{D} \frac{(x_{l,d} - \mu_{i,d})^2}{2\sigma_{i,d}^2}\right\} \quad (30)$$

The model parameter $\lambda$ may be expressed as follows.

$$\lambda = \{p_i, \mu_i, \sigma_i^2\} i=1,2,\ldots,K \quad (31)$$

The information processing device 900 calculates the logarithm likelihood $L_0(X|\lambda_{init})$ of the initial GMM for the feature parameter $\{X\}$ including the T feature vectors by the following equation in which the model parameter $\lambda_{init}$ of the initial GMM is assigned.

$$L(X \mid \lambda) = \frac{1}{T}\sum_{l=1}^{T} \log p(x_l \mid \lambda) \quad (32)$$

Next, the information processing device 900 calculates by the following equations the average value $\mu_{0,i}$, the variance $\sigma_{0,i}^2$, and the weight $p_{0,i}$ of the i-th Gaussian density function included in the GMM in the equation (28).

$$\mu_{0,i,d} = \frac{\sum_{l=1}^{T} p(i \mid x_l, \lambda) \cdot x_{l,d}}{\sum_{l=1}^{T} p(i \mid x_l, \lambda)} \quad (33)$$

$$\sigma_{0,i,d}^2 = \frac{\sum_{l=1}^{T} p(i \mid x_l, \lambda) \cdot x_{l,d}^2}{\sum_{l=1}^{T} p(i \mid x_l, \lambda)} - \mu_{0,i,d}^2 \quad (34)$$

$$p_{0,i} = \frac{1}{T}\sum_{l=1}^{T} p(i \mid x_l, \lambda) \quad (35)$$

where a posteriori probability for the i-th Gaussian function is given by the following equation.

$$p(i \mid x_l, \lambda) = \frac{p_i \cdot b_i(x_l)}{\sum_{k=1}^{K} p_k \cdot b_k(x_l)} \qquad (36)$$

When the calculation above is completed, the information processing device 900 calculates the logarithm likelihood $L_1$ (X|λ) of the GMM for the feature parameter {X} including the T feature vectors by the equation (33) in which the calculated model parameter $\lambda=\{u_{0,i}, \sigma_{0,i}^2, p_{0,i}\}$ is assigned.

When the degree of the increase of the logarithm likelihood $L_1$ (X|λ) with respect to the previously calculated logarithm likelihood $L_0$ (X|$\lambda_{init}$) is equal to or exceeds the threshold, the information processing device 900 performs an operation by the equations (34) through (37), and calculates the model parameter λ. Similarly, the operation is performed by the equations (34) through (37) to calculate the model parameter λ until the degree of the increase of the logarithm likelihood $L_{n+1}$ (X|λ) calculated the (n+1)th time with respect to the logarithm likelihood $L_n$ (X|λ) calculated n-th time is smaller than the threshold.

In addition, when the degree of the increase of the logarithm likelihood $L_{n+1}$ (X|λ) calculated the (n+1)th time with respect to the logarithm likelihood $L_n$ (X|λ) calculated n-th time is smaller than the threshold, the information processing device 900 terminates the process of calculating the GMM by the EM algorithm.

In the process above, the information processing device 900 can calculate the model parameter $\lambda_{gen}$ of the basic model. The model parameter $\lambda_{gen}$ can be expressed by the following equation.

$$\lambda_{gen}=\{p_{0,i},\mu_{0,i},\sigma_{0,i}^2\} i=1,2,\ldots,K \qquad (37)$$

The basic model is estimated by the processes above.

When the model parameter $\lambda_{gen}$ of the basic model is calculated, the information processing device 900 passes control to step S1107.

In step S1107, the information processing device 900 performs the following operation to calculate the model parameter $\lambda_{calm}$ of the static state model for unspecific speakers by adapting the basic model to a large number of pieces of the static state utterance data 902.

For the operations described below, the Bayesian adaptation disclosed by the patent document 4 etc. may be used. When the Bayesian adaptation is used, the correspondence between the distribution before the Bayesian adaptation and the distribution after the Bayesian adaptation may be easily grasped. For example, the amount of change after the Bayesian adaptation in the distribution of certain distribution numbers may be obtained by comparing the values of the distributions in the same distribution number. However, for consistency in the description of the present embodiment, the non-patent document 4 uses "T" for the index of the frame number, but the present embodiment uses "L" for the index of the frame number. Furthermore, although the non-patent document 4 expresses the weight of the i-th Gaussian density function by $w_i$, the present embodiment expresses the weight of the i-th Gaussian density function by $p_i$. Also, although the non-patent document 4 expresses the i-th Gaussian density function by $p_i(x_t)$, the present embodiment expresses it by $b_i(x_l)$. Furthermore, the non-patent document 4 expresses the i-th posteriori probability by Pr (i|$x_t$) while the present embodiment expresses it by p (i|$x_l$, λ).

First, the information processing device 900 extract the feature parameter from among a large number of pieces of static state utterance data 902. Then, the information processing device 900 performs the Bayesian adaptation on the $T_{calm}$ feature vectors in the feature vectors included in the extracted feature parameter.

For example, the number of frames in the sense of probability in the Bayesian adaptation may be expressed by the following equation $$n_{2,i} = \sum_{l=1}^{T_{calm}} p(i \mid x_l, \lambda_{gen}) \qquad (38)$$

The primary moment may be expressed by the following equation.

$$E_{2,i}(x) = \frac{1}{n_{2,i}} \sum_{l=1}^{T_{calm}} p(i \mid x_l, \lambda_{gen}) \cdot x_l \qquad (39)$$

In addition, the secondary moment may be expressed by the following equation.

$$E_{2,i}(x^2) = \frac{1}{n_{2,i}} \sum_{l=1}^{T_{calm}} p(i \mid x_l, \lambda_{gen}) \cdot x_l^2 \qquad (40)$$

The data dependent adaptive coefficient $\alpha_{2,i}^\rho$, $\rho=\{w, m, v\}$ may be expressed by the following equation using the parameter γ for adjustment of the degree of the adaptation called a "Bayesian factor". The "ρ" is an index (subscript) indicating a weight (w), an average value (m), or a variance (v) of the Gaussian density function, and is not a numeric.

$$\alpha_{2,i}^\rho = \frac{n_{2,i}}{n_{2,i} + r^\rho} \qquad (41)$$

The information processing device 900 calculates the model parameters included in the GMM, that is, the weight $p_{2,i}$, the average value $\mu_{2,i}$, and the variance $\sigma_{2,i}^2$, by the following equation using the adaptive coefficient $\alpha_{2,i}^\rho$ appearing in the equation (42).

$$p_{2,i} = \left\{ \alpha_{2,i}^w \cdot \frac{n_{2,i}}{T_{calm}} + (1 - \alpha_{2,i}^w) \cdot p_{0,i} \right\} \cdot \gamma_2 \qquad (42)$$

$$\mu_{2,i} = \alpha_{2,i}^m \cdot E_{2,i}(x) + (1 - \alpha_{2,i}^m) \cdot \mu_{0,i} \qquad (43)$$

$$\sigma_{2,i}^2 = \alpha_{2,i}^v \cdot E_{2,i}(x^2) + (1 - \alpha_{2,i}^v) \cdot (\sigma_{0,i}^2 + \mu_{0,i}^2) - \mu_{2,i}^2 \qquad (44)$$

"$\gamma_2$" is a scale factor constant for amendment to be made so that the sum of the weights $p_{2,i}$ of all Gaussian density functions included in the GMM may be 1.0. The scale factor constant $\gamma_2$ may be obtained by the following equation.

$$\gamma_2 = \frac{1}{\sum_{k=1}^{K} p_{2,i}} \qquad (45)$$

The information processing device 900 can obtain the model parameter $\lambda_{calm}$ of the static state model for unspecific speakers by performing the operation only once by the equations (42) through (44) above. The model parameter $\lambda_{calm}$ may be expressed by the following equation.

$$\lambda_{calm} = \{p_{2,k}, \mu_{2,k}, \sigma_{2,k}^2\} k=1,2,\ldots,K \quad (46)$$

By the processes above, the static state model for unspecific speakers is estimated.

When the model parameter $\lambda_{calm}$ of the static state model for unspecific speakers is calculated, the information processing device 900 passes control to step S1108.

In step S1108, the information processing device 900 performs the following operation to adapt the static state model for unspecific speakers to the large number of pieces of abnormal state utterance data 903, thereby calculating the model parameter $\lambda_{abn}$ of the abnormal state model for unspecific speakers. The operation described below may be performed by the Bayesian adaptation disclosed by the patent document 4 etc. as in step S1107.

First, the information processing device 900 extracts a feature parameter from among the large number of pieces of abnormal state utterance data 903. Then, the information processing device 900 perform the Bayesian adaptation to the $T_{abn}$ feature vectors in the feature vectors included in the extracted feature parameter.

For example, the number of frames in the sense of probability in the Bayesian adaptation may be expressed by the following equation.

$$n_{3,i} = \sum_{l=1}^{T_{abn}} p(i \mid x_l, \lambda_{calm}) \quad (47)$$

The primary moment may be expressed by the following equation.

$$E_{3,i}(x) = \frac{1}{n_{3,i}} \sum_{l=1}^{T_{abn}} p(i \mid x_l, \lambda_{calm}) \cdot x_l \quad (48)$$

The secondary moment may be expressed by the following equation.

$$E_{3,i}(x^2) = \frac{1}{n_{3,i}} \sum_{l=1}^{T_{abn}} p(i \mid x_l, \lambda_{calm}) \cdot x_l^2 \quad (49)$$

The data dependent adaptive coefficient $\alpha_{3,i}^\rho$, $\rho=\{w, m, v\}$ may be expressed by the following equation using the parameter $\gamma$ for adjustment of the degree of the adaptation called a "Bayesian factor". The "$\rho$" is an index (subscript) indicating a weight (w), an average value (m), or a variance (v) of the Gaussian density function, and is not a numeric.

$$\alpha_{3,i}^\rho = \frac{n_{3,i}}{n_{3,i} + r^\rho} \quad (50)$$

Then, the information processing device 900 calculates the model parameters included in the GMM, that is, the weight $p_{3,i}$, the average value $\mu_{3,i}$, and the variance $\sigma_{3,i}^2$, by the following equation using the adaptive coefficient $\alpha_{3,i}^\rho$ appearing in the equation (50).

$$p_{3,i} = \left\{ \alpha_{3,i}^w \cdot \frac{n_{3,i}}{T_{abn}} + (1 - \alpha_{3,i}^w) \cdot p_{2,i} \right\} \cdot \gamma_3 \quad (51)$$

$$\mu_{3,i} = \alpha_{3,i}^m \cdot E_{3,i}(x) + (1 - \alpha_{3,i}^m) \cdot \mu_{2,i} \quad (52)$$

$$\sigma_{3,i}^2 = \alpha_{3,i}^v \cdot E_{3,i}(x^2) + (1 - \alpha_{3,i}^v) \cdot (\sigma_{2,i}^2 + \mu_{2,i}^2) - \mu_{3,i}^2 \quad (53)$$

"$\gamma_3$" is a scale factor constant for amendment to be made so that the sum of the weights $p_{3,i}$ of all Gaussian density functions included in the GMM may be 1.0. The scale factor constant $\gamma_3$ may be obtained by the following equation.

$$\gamma_3 = \frac{1}{\sum_{k=1}^{K} p_{3,i}} \quad (54)$$

The information processing device 900 may obtain the model parameter $\lambda_{abn}$ of the abnormal state model for unspecific speakers by performing the operation by the equations (51) through (53) above. The model parameter $\lambda_{abn}$ may be expressed by the following equation.

$$\lambda_{abn} = \{p_{3,k}, \mu_{3,k}, \sigma_{3,k}^2\} k=1,2,\ldots,K \quad (55)$$

By the processes above, the abnormal state model for unspecific speakers is estimated.

When the model parameter $\lambda_{abn}$ of the abnormal state model for unspecific speakers is calculated, the information processing device 900 passes control to step S1109.

In step S1109, the information processing device 900 performs the following operations on all distributions, and calculates the difference between the model parameter $\lambda_{calm}$ calculated in step S1107 and the model parameter $\lambda_{abn}$ calculated in step S1108.

The information processing device 900 calculates by the following equation the amount of change in the distribution i from the average value included in the model parameter $\lambda_{calm}$ of the static state model for unspecific speakers to the average value included in the model parameter $\lambda_{abn}$ of the abnormal state model for unspecific speakers.

$$\mu_i' = \mu_{3,i} - \mu_{2,i} \quad (56)$$

The information processing device 900 calculates by the following equation the amount of change in the distribution i from the variance included in the model parameter $\lambda_{calm}$ of the static state model for unspecific speakers to the variance included in the model parameter $\lambda_{abn}$ of the abnormal state model for unspecific speakers.

$$\sigma_i'^2 = \sigma_{3,i}^2 - \sigma_{2,i}^2 \quad (57)$$

When the operations above are completed, the information processing device 900 stores the operation result as the correspondence table 431 in the storage unit etc. provided in the information processing device 900. Then, the information processing device 900 terminates the process for the advance preparation (step S1110).

In the present embodiment, the average value and the variance included in the model parameter are used in the correspondence table 431, but the weight of the distribution included in the model parameter may also be used. In this case, the information processing device 900 calculates the amount of change of the weight of the distribution in the distribution i by the following equation.

$p_i'=p_{3,i}-p_{2,i}$ (58)

Other Embodiment

Figure 12:
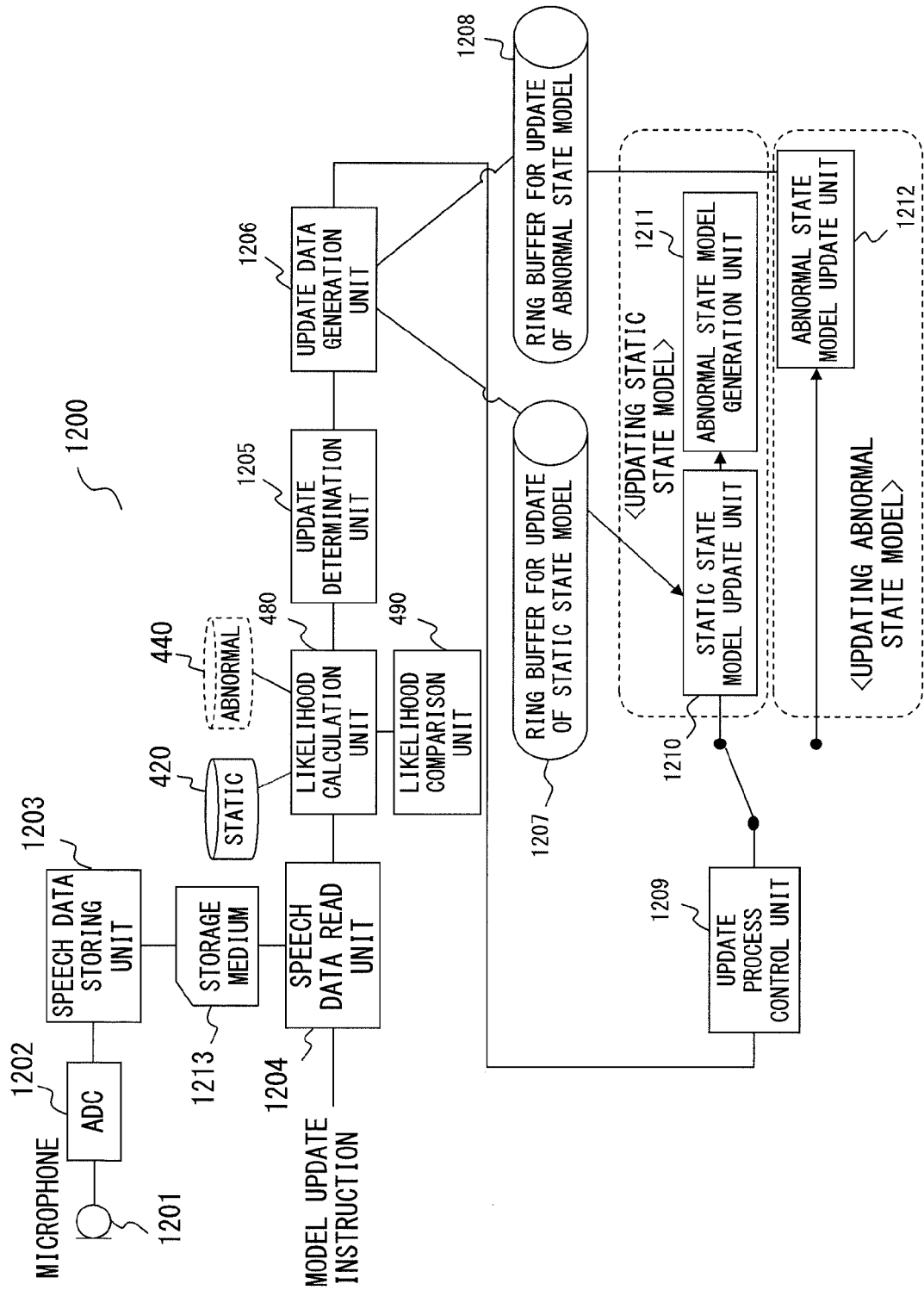
FIG. 12 is an explanatory view of a state detection device 1200.

FIG. 12 is an explanatory view of the state detection device 1200 according to the present embodiment.

The state detection device 1200 illustrated in FIG. 12 includes the storage units 410 through 440, the static state model generation unit 450, and the abnormal state model generation unit 460, but is omitted for simplicity of the figure.

The state detection device 1200 includes a ADC (analog digital converter) 1202, an speech data storing unit 1203, an speech data read unit 1204, the likelihood calculation unit 480, and the likelihood comparison unit 490. The state detection device 1200 also includes an update determination unit 1205 and an update data generation unit 1206. The state detection device 1200 further includes a ring buffer 1207 for update of a static state model and a ring buffer 1208 for update of an abnormal state model. Furthermore, the state detection device 1200 includes an update process control unit 1209, a static state model update unit 1210, an abnormal state model generation unit 1211, and an abnormal state model update unit 1212.

The ADC 1202 converts the speech signal of the speaker acquired through a microphone 1201 from an analog signal to a digital signal, and outputs the converted speech data to the audio storing unit 1203. Upon receipt of the speech data from the ADC 1202, the audio storing unit 1203 stores the received speech data in a storage medium 1213. The storage medium 1213 may use various storage media such as USB memory, an SD card, etc.

Upon receipt of an instruction to update a model, the speech data read unit 1204 reads the speech data stored in the storage medium 1213, and outputs the read speech data to the likelihood calculation unit 480.

The likelihood calculation unit 480 calculates the likelihood of the speech data received from the speech data read unit 1204 with the static state model for a specific speaker and with the abnormal state model for a specific speaker. Then, the likelihood calculation unit 480 outputs the calculated likelihood to the likelihood comparison unit 490 and the update determination unit 1205.

The likelihood comparison unit 490 determines the state of the speaker who has uttered the voice input to the microphone 1201, for example, whether the speaker is in the static state or in the abnormal state, based on the two likelihoods calculated by the likelihood calculation unit 480. Then, the likelihood comparison unit 490 outputs the determination result to a specified device etc.

The update determination unit 1205 determines whether or not the static state model for a specific speaker or the abnormal state model for a specific speaker is updated depending on the likelihood received from the likelihood calculation unit 480. In the present embodiment, when the static state model for a specific speaker is to be updated, the abnormal state model for a specific speaker is simultaneously updated, but only the static state model for a specific speaker may be updated. The update determination unit 1205 outputs the determination result to the update data generation unit 1206.

The update data generation unit 1206 outputs the determination result received from the update determination unit 1205 to the update process control unit 1209. When the determination result received from the update determination unit 1205 is the update of the static state model for a specific speaker, the update data generation unit 1206 extracts a feature parameter from the speech data read from the storage medium 1213. Then, the update data generation unit 1206 stores the extracted feature parameter in the ring buffer 1207 for update of a static state model.

In addition, when the determination result received from the update determination unit 1205 is the update of the abnormal state model for a specific speaker, the update data generation unit 1206 extracts the feature parameter from the speech data read from the storage medium 1213. Then, the update data generation unit 1206 stores the extracted feature parameter in the ring buffer 1208 for update of an abnormal state model.

The ring buffer 1207 for update of a static state model and the ring buffer 1208 for update of an abnormal state model are ring buffers provided with a specified storage capacity. When the storage capacity is fully used, the ring buffer 1207 for update of a static state model and the ring buffer 1208 for update of an abnormal state model overwrite new data in order from the area storing older data.

The update process control unit 1209 instructs the static state model update unit 1210 or the abnormal state model update unit 1212 to perform the update process based on the determination result received from the update data generation unit 1206.

For example, if the determination result received from the update determination unit 1205 refers to the update of a static state model for a specific speaker, the update process control unit 1209 instructs the static state model update unit 1210 to update a static state model for a specific speaker. If the determination result received from the update determination unit 1205 refers to the update of an abnormal state model for a specific speaker, the update process control unit 1209 instructs the abnormal state model update unit 1212 to update an abnormal static state model for the specific speaker.

The static state model update unit 1210 reads a feature parameter from the ring buffer 1207 for update of a static state model. Then, the static state model update unit 1210 estimates a new static state model for a specific speaker from the static state model for a specific speaker stored in the storage unit 420 by the Bayesian adaptation using the read feature parameter. Then, the static state model update unit 1210 updates the static state model for a specific speaker stored in the storage unit 420 to the newly estimated static state model for a specific speaker.

According to the present embodiment, a new static state model for a specific speaker is estimated from the static state model for a specific speaker stored in the storage unit 420, but the new static state model for a specific speaker may be estimated from a basic model.

The abnormal state model generation unit 1211 adjusts the model parameter of the static state model for a specific speaker estimated by the static state model update unit 1210 according to the correspondence table 431 and generates a new abnormal state model for a specific speaker. Then, the abnormal state model generation unit 1211 updates the abnormal state model for a specific speaker stored in the storage unit 440 to the newly generated abnormal state model for a specific speaker.

The abnormal state model update unit 1212 reads a feature parameter from the ring buffer 1208 for update of an abnormal state model. Then, the abnormal state model update unit 1212 estimates a new abnormal state model for a specific speaker from the abnormal state model for a specific speaker stored in the storage unit 440 by the Bayesian adaptation using the read feature parameter. The abnormal state model update unit 1212 updates the abnormal state model for a specific speaker stored in the storage unit 440 to the newly estimated abnormal state model for a specific speaker.

In the present embodiment, a new abnormal state model for a specific speaker is estimated from the abnormal state model for a specific speaker stored in the storage unit 440, but a new abnormal state model for a specific speaker may be estimated from a basic model.

Figure 13:
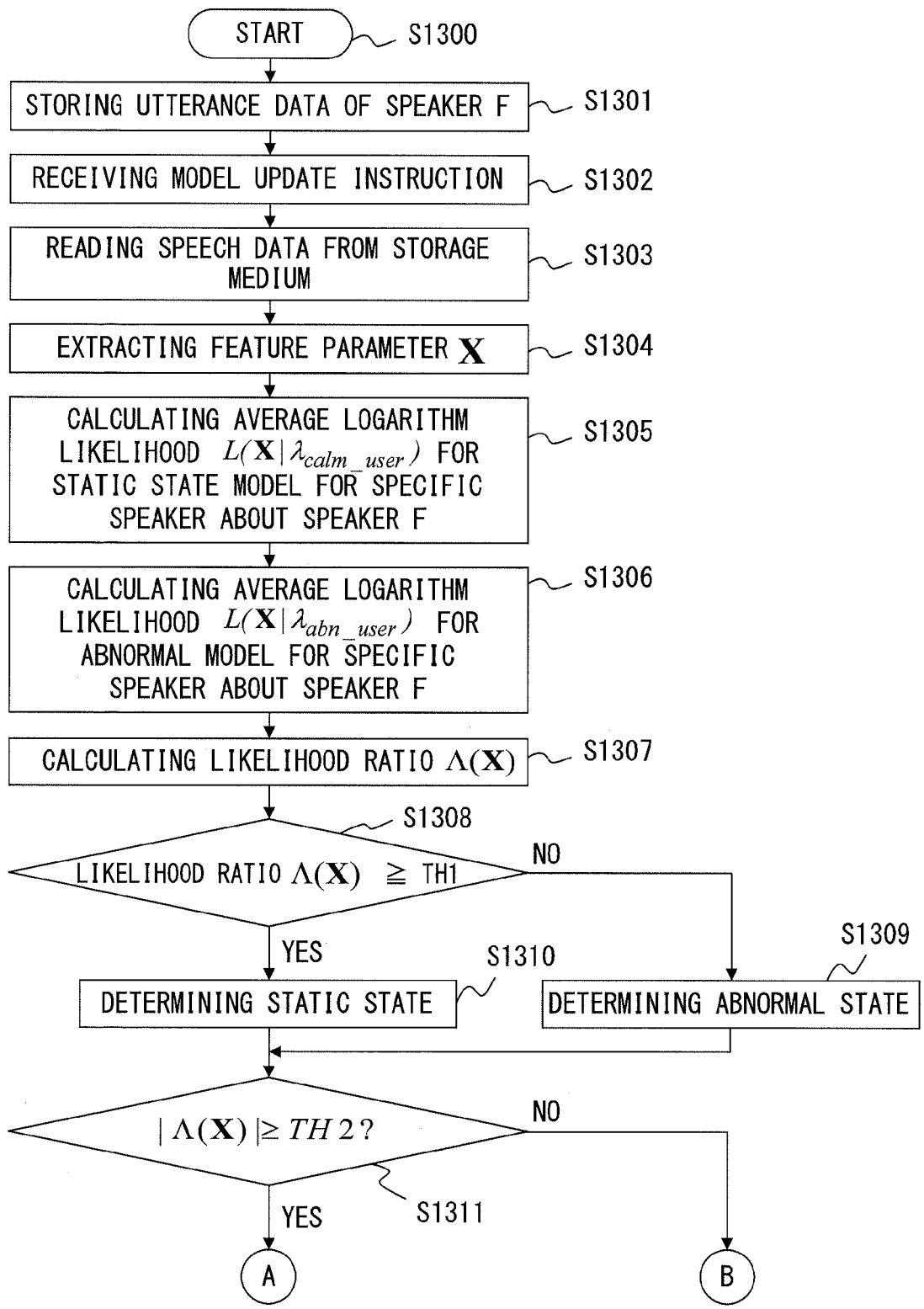
FIG. 13 is a flowchart of an operation of the state detection device 1200.
Figure 14:
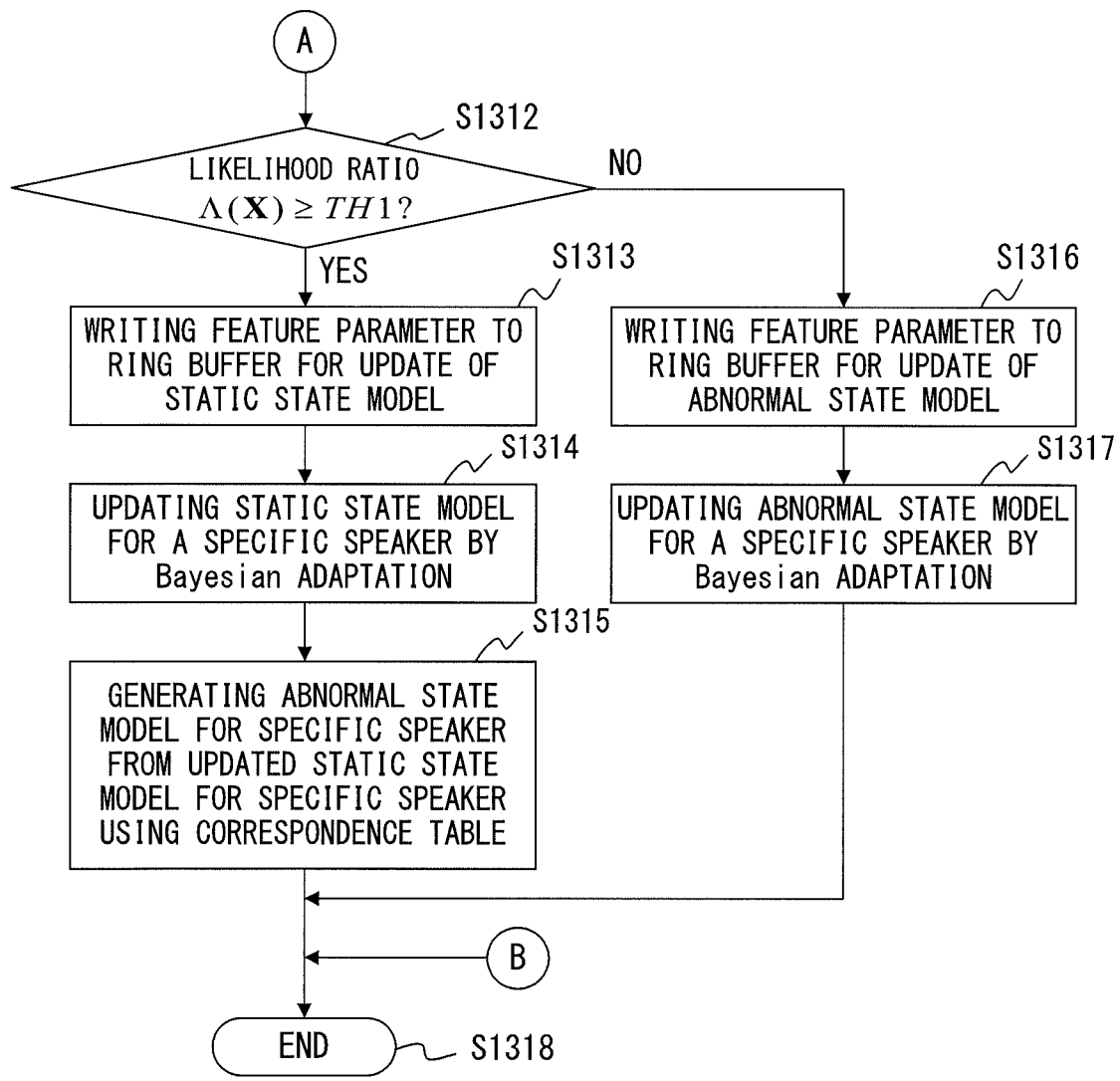
FIG. 14 is a flowchart of an operation of the state detection device 1200.

FIGS. 13 and 14 are flowcharts of the operation of the state detection device 1200 according to the present embodiment.

When the voice of the speaker F is input through the microphone 1201, the state detection device 1200 starts the following process (step S1300).

In step S1301, the state detection device 1200 converts the input voice of the speaker F to the digital data. Then, the state detection device 1200 stores the digitized speech data of the speaker F in the storage medium 1213.

The state detection device 1200 receives an instruction to update a model from an input unit provided for the state detection device 1200 or the CPU (central processing unit) etc. provided for a device including the state detection device 1200, for example, a mobile telephone etc. (step S1302). In this case, the state detection device 1200 reads the speech data of the speaker F from the storage medium 1213 (step S1303).

The state detection device 1200 performs the processes in steps S1304 through S1310, and calculates the likelihood ratio Λ (X). The processes in steps S1304 through S1310 are similar to those in steps S802 through S808 in FIG. 8, and the detailed description is omitted here.

When the absolute value |Λ (X)| of the likelihood ratio Λ (X) is smaller than the threshold TH2 (NO in step S1311), the state detection device 1200 terminates the process (step S1318). The threshold TH2 uses the value with which the likelihood ratio Λ clearly indicates the static state or the abnormal state.

When the absolute value |Λ (X)| of the likelihood ratio Λ (X) is equal to or exceeds the threshold TH2 (YES in step S1311), the state detection device 1200 determines that the speaker F is clearly in the static state or the abnormal state. Therefore, the state detection device 1200 determines that the model may be updated, and passes control to step S1312.

Then, when the likelihood ratio Λ (X) is equal to or exceeds the threshold TH1 (YES in step S1312), the state detection device 1200 determines that the speaker F is clearly in the static state, the static state model for a specific speaker is to be updated, and control is passed to step S1313. In this case, the state detection device 1200 extracts a feature parameter from the speech data stored in the storage medium 1213. Then, the state detection device 1200 writes the extracted feature parameter to the ring buffer 1207 for update of a static state model (step S1313).

In step S1314, the state detection device 1200 reads the feature parameter from the ring buffer 1207 for update of a static state model. Then, the state detection device 1200 estimates a new static state model for a specific speaker from the static state model for a specific speaker stored in the storage unit 420 by the Bayesian adaptation using the read feature parameter. The estimating process may be realized by the state detection device 1200 executing the process similar to the process in step S703 in FIG. 7. The state detection device 1200 updates the static state model for a specific speaker stored in the storage unit 420 to the newly estimated static state model for a specific speaker.

In step S1315, the state detection device 1200 adjusts the model parameter of the static state model for a specific speaker updated in step S1314 according to the correspondence table 431, and generates a new abnormal state model for a specific speaker. The generating process may be realized by the state detection device 1200 executing the process similar to the process in step S704 in FIG. 7. The state detection device 1200 updates the abnormal state model for a specific speaker stored in the storage unit 440 to the newly generated abnormal state model for a specific speaker. Then, the state detection device 1200 terminates the process (step S1318).

On the other hand, when the likelihood ratio Λ (X) is smaller than the threshold TH1 (NO in step S1312), the state detection device 1200 determines that the speaker F is clearly in the abnormal state, the abnormal state model for a specific speaker is to be updated, and passes control to step S1316. In this case, the state detection device 1200 extracts a feature parameter from the speech data stored in the storage medium 1213. Then, the state detection device 1200 writes the extracted feature parameter to the ring buffer 1208 for update of an abnormal state model (step S1316).

In step S1317, the state detection device 1200 reads the feature parameter from the ring buffer 1208 for update of an abnormal state model. Then, the state detection device 1200 estimates a new abnormal state model for a specific speaker from the abnormal state model for a specific speaker stored in the storage unit 440 by the Bayesian adaptation using the read feature parameter. The estimating process may be realized by the state detection device 1200 performing the process similar to the process in step S703 in FIG. 7. The state detection device 1200 updates the abnormal state model for a specific speaker stored in the storage unit 440 to the newly estimated abnormal state model for a specific speaker. Then, the state detection device 1200 terminates the process (step S1318).

Figure 15:
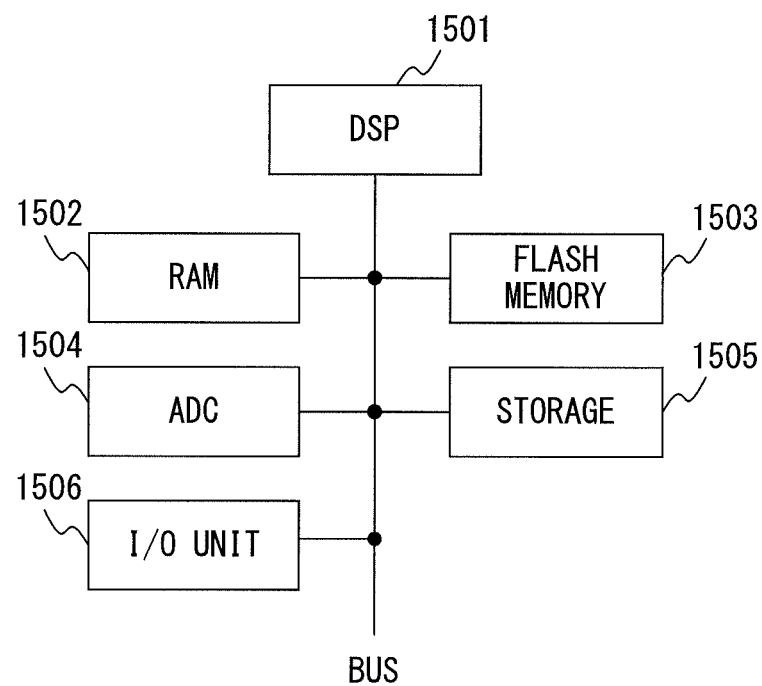
FIG. 15 is an example of a configuration of the state detection device described with reference to an embodiment.

FIG. 15 is an example of the configuration of the state detection device described with reference to the embodiment above. The configuration in FIG. 15 may be applied to any of the state detection device 300, the state detection device 400, and the state detection device 1200. Described below is the state detection device 400 as an example.

The state detection device illustrated in FIG. 15 includes a DSP 1501, RAM 1502, flash memory 1503, an ADC 1504, storage 1505, and an I/O unit 1506. These devices are connected to a bus for communication of data with one another.

The DSP 1501 is an arithmetic device for reading a program etc. which realizes the state detection according to the present embodiment from the RAM 1502, and executing it. For example, the static state model generation unit 450, the abnormal state model generation unit 460, the feature parameter extraction unit 470, the likelihood calculation unit 480, the likelihood comparison unit 490, etc. illustrated in FIG. 4 may be realized by allowing the DSP 1501 to execute a specified program.

In addition, for example, the speech data storing unit 1203, the speech data read unit 1204, the update determination unit 1205, the update data generation unit 1206, the update process control unit 1209, the static state model update unit 1210, the abnormal state model generation unit 1211, the abnormal state model update unit 1212, etc. illustrated in FIG. 12 may be realized by allowing the DSP 1501 to execute a specified program.

The RAM 1502 is a volatile storage device used for executing a program for realizing the state detection according to the present embodiment.

The flash memory 1503 is a non-volatile storage device for storing a program realizing the detection of the state according to the present embodiment.

The ADC 1504 is a device for converting an analog signal into a digital signal. For example, the ADC 1504 generates speech data by digitizing an analog signal such as speech signals etc.

The storage 1505 is a non-volatile storage device storing a large amount of data, for example, speech data etc. The storage 1505 may be, for example, a magnetic disk storage device etc. The storage 1505 may be used as the storage units 410 through 440, the ring buffer 1207 for update of a static state model, the ring buffer 1208 for update of an abnormal state model, etc.

The I/O unit 1506 controls the input/output of data with an external device. For example, the result of the state detection according to the present embodiment is output to the specified device connected to the state detection device 400.

A readable storage medium to an information processing device such as the RAM 1502, the flash memory 1503, the storage 1505, etc. may be used as a non-transitory medium.

FIG. 16 is an example of the configuration of the mobile telephone 1600 including a state detection device described above with reference to the embodiments above.

The mobile telephone 1600 includes a state detection device 1601, a control unit 1602, a communication control unit 1603, a speaker 1604, a microphone 1605, and a display unit 1606.

The state detection device 1601 may be the state detection device 300, the state detection device 400, or the state detection device 1200.

The control unit 1602 controls the entire mobile telephone 1600. For example, the control unit 1602 digitizes the voice input from the microphone 1605 and output to the communication control unit 1603. In addition, the control unit 1602 outputs the speech data transmitted from the communication control unit 1603 to the 1605.

In addition, the control unit 1602 outputs the speech data transmitted from the microphone 1605 to the state detection device 1601. Then, the control unit 1602 displays the determination result output from the state detection device 1601 on the display unit 1606.

The control unit 1602 outputs the speech data transmitted from the communication control unit 1603 to the state detection device 1601. Then, the control unit 1602 instructs the state detection device 1601 to enrol a speaker and update a model.

The communication control unit 1603 controls the communication in accordance with a specified protocol, and transmits the speech data received from the control unit 1602 to the mobile telephone as a destination. The communication control unit 1603 outputs the speech data transmitted from the mobile telephone as the destination to the control unit 1602.

In the state detection device described with reference to the embodiments above, the storage unit 410 may be an example of a basic model storage unit.

When the undepressed state is a static state, it is considered that the depressed state is an abnormal state. In this case, the static state model for unspecific speakers may be an example of the first unspecific speaker model. The abnormal state model for unspecific speakers may be an example of a second unspecific speaker model. The static state model of the speaker F may be an example of a first specific speaker model. The static state model generation unit 450 may be an example of a first model generation unit. The abnormal state model of the speaker F may be an example of a second specific speaker model. The abnormal state model generation unit 460 may be an example of a second model generation unit.

The correspondence table 431 may be an example of correspondence information. The storage unit 430 may be an example of a correspondence information storage unit. The likelihood calculation unit 480 may be an example of a likelihood calculation unit. The likelihood comparison unit 490 may be an example of a state determination unit.

The update determination unit 1205 may be an example of an update determination unit. The components including the update data generation unit 1206, the update process control unit 1209, the static state model update unit 1210, the abnormal state model generation unit 1211, and the abnormal state model update unit 1212 may be an example of a model update unit.

As described above, the state detection device 400 estimates a static state model for a specific speaker about the specific speaker F from the static state utterance data of the specific speaker, for example, the speaker F. Then, the state detection device 400 estimates a abnormal state model for a specific speaker about the specific speaker F by adjusting the parameter included in the static state model for a specific speaker about the specific speaker F according to the correspondence table 431.

Thus, the state detection device 400 detects a state using the static state model for a specific speaker specialized for the specific speaker F generated from the static state utterance data of the specific speaker F, and the abnormal state model for a specific speaker estimated from the static state model for a specific speaker. Therefore, the state detection device 400 can detect the state about the specific speaker F with high accuracy.

In addition, the state detection device 400 estimates a abnormal state model for a specific speaker about the specific speaker F from the static state model for a specific speaker about the specific speaker F. Therefore, the state detection device 400 can be free of a process of a heavy load in which a abnormal state model for a specific speaker about the specific speaker F is estimated from the abnormal state utterance data about the specific speaker F. As a result, the state detection device 400 can suppress the load imposed during the enrolment of a speaker.

In estimating the static state model for a specific speaker and the abnormal state model for a specific speaker about the specific speaker F, only the static state utterance data of the specific speaker F is used. Therefore, the user detects the state using the state detection device 400 if only the static state utterance data about the specific speaker F is enrolled in the state detection device 400. As a result, the state detection device 400 can allow the user to easily perform state detection. Since the user may enrol the utterance data of the specific speaker F in the static state which can be easily acquired, not the utterance data of the specific speaker F in the abnormal state which may not be easily acquired, the state detection device 400 can allow the user to easily perform state detection.

When the speech data which clearly indicates the static state or the abnormal state is input, the state detection device 1200 uses the speech data and updates the static state model for a specific speaker or the abnormal state model for a specific speaker. As a result, the state detection device 1200 can detect the state of a specific speaker F with higher accuracy.

As described above, according to the disclosed state detection device, the state of the specific speaker can be detected with high accuracy with the load suppressed on the state detection device.

The procedure of the process illustrated in the flowcharts in FIGS. 7, 8, 11, 13, and 14 is not intended for limiting the order of the processes. Therefore, it is obvious that the order of the processes may be changed if necessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A state detection device, comprising:
a basic model storage unit to store a basic model obtained by modeling a feature of voice acquired from a plurality of unspecific speakers;
a correspondence information storage unit to store correspondence information including an amount of displacement from a first unspecific speaker model obtained by modeling a speech feature of the unspecific speakers in an undepressed state to a second unspecific speaker model obtained by modeling the speech feature of the unspecific speakers in a depressed state;
a first model generation unit that extracts the speech feature of a specific speaker in the undepressed state from input voice of the specific speaker, and adjusts the basic model so that the extracted feature is indicated to generate a first specific speaker model obtained by modeling speech features of the specific speaker in the undepressed state;
a second model generation unit that reflects the amount of the displacement from the first unspecific speaker model to the second unspecific speaker model on the first specific speaker model using the correspondence information to generate a second specific speaker model obtained by modeling the speech features of the specific speaker in the depressed state;
a likelihood calculation unit to calculate a first likelihood as a likelihood of the first specific speaker model with respect to the feature of the input voice, and a second likelihood as a likelihood of the second specific speaker model with respect to the input voice; and
a state determination unit to determine a state of the speaker of the input voice using a likelihood ratio of the first likelihood and the second likelihood.

2. The device according to claim 1, wherein the first model generation unit extracts a feature parameter indicating the speech features of the specific speaker in the undepressed state, generates a parameter included in the basic model from the feature parameter, and generates the first specific speaker model by reflecting the parameter on the basic model.

3. The device according to claim 1, wherein the second model generation unit generates the second specific speaker model by reflecting a first amount of parameter displacement from a first parameter included in the first unspecific speaker model to a second parameter included in the second unspecific speaker model on a third parameter included in the first specific speaker model using the correspondence information.

4. The device according to claim 1, further comprising:
an update determination unit to determine whether the first specific speaker model or the second specific speaker model is to be updated using the first likelihood and the second likelihood; and
a model update unit to update the first specific speaker model or the second specific speaker model using the determination of the update determination unit.

5. The device according to claim 4, wherein the model update unit comprises:
a first model update unit to update the first specific speaker model by extracting the feature of the input voice and adjusting the first specific speaker model so that the extracted feature is indicated; and
a second model update unit to update the second specific speaker model by reflecting the amount of the displacement from the first unspecific speaker model to the second unspecific speaker model on the first specific speaker model updated by the first model update unit using the correspondence information.

6. The device according to claim 4, wherein the model update unit further comprises a second model update unit to update the second specific speaker model by extracting the feature of the input voice and adjusting the second specific speaker model so that the extracted feature is indicated.

7. The device according to claim 2, wherein the feature parameter includes at least one of a parameter relating to a pulse signal detected when a speaker utters voice, a parameter relating to an amount of change with time of the pulse signal, and a parameter relating to intensity of voice uttered by a speaker.

8. The device according to claim 7, wherein a parameter relating to a pulse signal detected when a speaker utters voice includes logarithm LPC (linear predictive coding) residual power.

9. The device according to claim 7, wherein a parameter relating to an amount of change with time of intensity of the pulse includes Δ logarithm LPC (linear predictive coding) residual power.

10. The device according to claim 7, wherein a parameter relating to intonation of voice uttered by a speaker includes a pitch frequency of the voice.

11. The device according to claim 7, wherein a parameter relating to intensity of voice uttered by a speaker includes a numerical value of flatness of an LPC (linear predictive coding) residual spectrum in a high frequency band of the voice.

12. The device according to claim 1, wherein when a ratio of the second likelihood to the first likelihood is equal to or exceeds a threshold, the state determination unit determines that the state of the speaker of the input voice is in the undepressed state.

13. The device according to claim 1, wherein when a ratio of the second likelihood to the first likelihood is smaller than a threshold, the state determination unit determines that the state of the speaker of the input voice is in the depressed state.

14. A mobile telephone, comprising:
a correspondence information storage unit to store correspondence information including an amount of displacement from a first unspecific speaker model obtained by modeling speech features of unspecific speakers in an undepressed state to a second unspecific speaker model obtained by modeling the speech features of the unspecific speakers in a depressed state;
a first model generation unit that extracts the speech features of a specific speaker in the undepressed state from input voice of the specific speaker, and adjusts the basic model read from a basic model storage unit for storing a basic model obtained by modeling the speech features acquired from a plurality of the unspecific speakers so that the extracted feature is indicated to generate a first specific speaker model obtained by modeling the speech features of the specific speaker in the undepressed state;
a second model generation unit that reflects the amount of displacement from the first unspecific speaker model to the second unspecific speaker model on the first specific speaker model using the correspondence information to generate a second specific speaker model obtained by modeling the speech features of the specific speaker in the depressed state;
a likelihood calculation unit to calculate a first likelihood as a likelihood of the first specific speaker model with respect to the feature of the input voice, and a second likelihood as a likelihood of the second specific speaker model with respect to the input voice; and a state determination unit to determine a state of the speaker of the input voice using a likelihood ratio of the first likelihood and the second likelihood.

15. A state detecting method used by an information processing device performing the processes comprising:

reading a basic model from a storage unit storing the basic model obtained by modeling a feature of voice acquired from a plurality of unspecific speakers;

extracting speech features of a specific speaker in the undepressed state from input voice of the specific speaker, adjusting the basic model obtained by modeling the feature of the voice acquired from the plurality of the unspecific speakers so that the extracted feature is indicated, and generating a first specific speaker model obtained by modeling the speech features of the specific speaker in the undepressed state;

reading correspondence information from a storage unit for storing the correspondence information including an amount of displacement from a first unspecific speaker model obtained by modeling the speech features of the unspecific speakers in the undepressed state to a second unspecific speaker model obtained by modeling the speech features of the unspecific speakers in a depressed state;

reflecting the amount of the displacement from the first unspecific speaker model to the second unspecific speaker model on the first specific speaker model according to the correspondence information to generate a second specific speaker model obtained by modeling the speech features of the specific speaker in the depressed state;

calculating a first likelihood as a likelihood of the first specific speaker model with respect to the feature of the input voice, and a second likelihood as a likelihood of the second specific speaker model with respect to the input voice; and determining a state of the speaker of the input voice using a likelihood ratioratc of the first likelihood and the second likelihood.

16. A non-transitory storage medium storing a program used to direct an information processing device to perform the processes comprising:

reading a basic model from a storage unit storing the basic model obtained by modeling a feature of voice acquired from a plurality of unspecific speakers;

extracting speech features of a specific speaker in an undepressed state from input voice of the specific speaker, adjusting the basic model obtained by modeling the feature of the voice acquired from the plurality of the unspecific speakers so that the extracted feature is indicated, and generating a first specific speaker model obtained by modeling the speech features of the specific speaker in the undepressed state;

reading correspondence information from a storage unit for storing the correspondence information including an amount of displacement from a first unspecific speaker model obtained by modeling the speech features of the unspecific speakers in the undepressed state to a second unspecific speaker model obtained by modeling the speech features of the unspecific speakers in a depressed state;

reflecting the amount of the displacement from the first unspecific speaker model to the second unspecific speaker model on the first specific speaker model according to the correspondence information to generate a second specific speaker model obtained by modeling the speech features of the specific speaker in the depressed state;

calculating a first likelihood as a likelihood of the first specific speaker model with respect to the feature of the input voice, and a second likelihood as a likelihood of the second specific speaker model with respect to the input voice; and determining a state of the speaker of the input voice using a likelihood ratio of the first likelihood and the second likelihood.

* * * * *

UNITED STATES PATENT AND TRADEMARK OFFICE
CERTIFICATE OF CORRECTION

PATENT NO. : 8,996,373 B2
APPLICATION NO. : 13/253683
DATED : March 31, 2015
INVENTOR(S) : Shoji Hayakawa et al.

Page 1 of 1

It is certified that error appears in the above-identified patent and that said Letters Patent is hereby corrected as shown below:

In the Claims

Column 34, line 2, in claim 15, delete "ratioratc" and insert -- ratio --, therefor.

Signed and Sealed this
Twenty-third Day of June, 2015

Michelle K. Lee
*Director of the United States Patent and Trademark Office*